(12) United States Patent
Bae

(10) Patent No.: US 12,042,879 B2
(45) Date of Patent: Jul. 23, 2024

(54) LASER APPARATUS

(71) Applicant: NPS CO., LTD., Cheongju-si (KR)

(72) Inventor: Seong Ho Bae, Daejeon (KR)

(73) Assignee: NPS CO., LTD., Cheongju-si (KR)

( * ) Notice: Subject to any disclaimer, the term of this patent is extended or adjusted under 35 U.S.C. 154(b) by 722 days.

(21) Appl. No.: 17/079,223

(22) Filed: Oct. 23, 2020

(65) Prior Publication Data

US 2021/0121980 A1 Apr. 29, 2021

(30) Foreign Application Priority Data

Oct. 23, 2019 (KR) .......................... 10-2019-0132592
Nov. 23, 2019 (KR) .......................... 10-2019-0151778

(51) Int. Cl.
*B23K 26/042* (2014.01)
*B23K 26/02* (2014.01)
(Continued)

(52) U.S. Cl.
CPC ............ *B23K 26/042* (2015.10); *B23K 26/02* (2013.01); *B23K 26/043* (2013.01);
(Continued)

(58) Field of Classification Search
CPC ................ B23K 26/042; B23K 26/043; B23K 26/0643; B23K 26/1462; G02B 7/1822;
(Continued)

(56) References Cited

U.S. PATENT DOCUMENTS 4,675,501 A * 6/1987 Klingel ................ B23K 26/043
219/121.67
5,011,282 A * 4/1991 Ream ................... B23K 26/043
219/121.79
(Continued)

FOREIGN PATENT DOCUMENTS

CN 102497952 A 6/2012
JP H06190579 A * 7/1994
(Continued)

OTHER PUBLICATIONS

Machine Translation of JP-H06190579-A (Year: 1994).*

*Primary Examiner* — Geoffrey S Evans
(74) *Attorney, Agent, or Firm* — Bridgeway IP Law Group, PLLC; Jihun Kim

(57) ABSTRACT

Disclosed herein is a laser apparatus including: a laser oscillator configured to generate a laser beam; a plurality of mirror mount assemblies each arranged in one of predetermined reference transmission steps, each of the mirror mount assemblies including: a mount-side reflective mirror configured to reflect and transmit the laser beam; and an aligner configured to change alignment of the mount-side reflective mirror to adjust a machining optical path through which the laser beam transmitted by the mount-side reflective mirror travels; a laser nozzle assembly including a laser nozzle configured to radiate the laser beam transmitted from the mirror mount assembly located in the last step of the reference transmission steps onto an object to be processed; a database configured to store big data constructed to include (Continued)

optical path adjustment data indicating a pattern of selective adjustment of the machining optical path by the mount-side reflective mirror linked with the aligner according to a driving method of the aligner; and a controller configured to correct, when distortion occurs in the machining optical path, the distortion of the machining optical path by selectively driving the aligner provided in each of at least one mirror mount assembly among the mirror mount assemblies based on the big data using a driving method according to a pattern of the distortion of the machining optical path.

20 Claims, 20 Drawing Sheets

(51) Int. Cl.
*B23K 26/04* (2014.01)
*B23K 26/06* (2014.01)
*B23K 26/082* (2014.01)
*B23K 26/14* (2014.01)
*G02B 7/182* (2021.01)

(52) U.S. Cl.
CPC ........ *B23K 26/0643* (2013.01); *B23K 26/082* (2015.10); *B23K 26/1462* (2015.10); *G02B 7/1822* (2013.01); *G02B 7/1825* (2013.01); *G02B 7/1827* (2013.01)

(58) Field of Classification Search
CPC ................ G02B 7/1825; G02B 7/1827; G05B 2219/45041; G05B 2219/45165
See application file for complete search history.

(56) References Cited

U.S. PATENT DOCUMENTS 5,034,618 A * 7/1991 Akeel ................ B23K 26/0884
356/152.1
2021/0109341 A1* 4/2021 Bae .................... B23K 26/1462

FOREIGN PATENT DOCUMENTS

| JP | H06190579 A | 7/1994 |
| JP | H08103881 A | 4/1996 |

* cited by examiner

LASER APPARATUS

CROSS-REFERENCE TO RELATED APPLICATION

This application claims priority to Korean Patent Application No. 10-2019-0132592, filed on Oct. 23, 2019, and Korean Patent Application No. 10-2019-0151778, filed on Nov. 23, 2019, in the Korean Intellectual Property Office, the disclosures of each of which are incorporated herein by reference.

BACKGROUND OF THE INVENTION

Field of the Invention

The present disclosure relates to a laser apparatus.

Description of the Related Art

In recent years, in the field of machining apparatuses such as cutting devices and marking devices, use of laser apparatuses employing laser beams having excellent physical properties is increasing.

In general, a laser apparatus includes a laser oscillator configured to generate and oscillate a laser beam, an optical system configured to transmit the laser beam oscillated by the laser oscillator according to a predetermined transmission scheme, and a laser nozzle configured to condense the laser beam transmitted through the optical system and radiate the same onto an object.

External force and vibration applied from the outside, wear and aging of the components of the laser apparatus, and other causes may change the alignment of the optical members provided in the optical system, resulting in distortion of the optical path of the laser beam. Accordingly, the laser beam, displaced from the predetermined optical path, may be transmitted to the laser nozzle. As a result, the laser beam emitted from the laser nozzle may be deviated from the predetermined machining position when radiated onto the object to be processed. Thereby, the machining quality of the processed object may be adversely affected.

In this regard, the conventional laser apparatuses fail to quickly cope with distortion of the optical path of a laser beam because they do not have an element capable of diagnosing and correcting the distortion of the optical path of the laser beam.

SUMMARY OF THE INVENTION

Therefore, the present invention has been made in view of the above problems, and it is an object of the present disclosure to provide a laser apparatus having a structure improved to automatically diagnose distortion of an optical path of a laser beam.

It is another object of the present disclosure to provide a laser apparatus having a structure improved to automatically correct optical path distortion of a laser beam.

In accordance with an aspect of the present disclosure, the above and other objects can be accomplished by the provision of a laser apparatus including: a laser oscillator configured to generate a laser beam; a plurality of mirror mount assemblies each arranged in one of predetermined reference transmission steps, each of the mirror mount assemblies including: a mount-side reflective mirror configured to reflect and transmit the laser beam; and an aligner configured to change alignment of the mount-side reflective mirror to adjust a machining optical path through which the laser beam transmitted by the mount-side reflective mirror travels; a laser nozzle assembly including a laser nozzle configured to radiate the laser beam transmitted from the mirror mount assembly located in the last step of the reference transmission steps onto an object to be processed; a database configured to store big data constructed to include optical path adjustment data indicating a pattern of selective adjustment of the machining optical path by the mount-side reflective mirror linked with the aligner according to a driving method of the aligner; and a controller configured to correct, when distortion occurs in the machining optical path, the distortion of the machining optical path by selectively driving the aligner provided in each of at least one mirror mount assembly among the mirror mount assemblies based on the big data using a driving method according to a pattern of the distortion of the machining optical path.

The aligner may include a dial configured to change the alignment of the mount-side reflective mirror according to a rotation direction and rotation angle; and a drive motor configured to rotate the dial, the laser apparatus further including a data collection module configured to collect the optical path adjustment data and update the big data by tracking, when the dial is rotated by intermittently rotating the drive motor by a predetermined minimum rotation angle, a pattern of intermittently adjustment of the machining optical path by the dial by a unit optical path displacement amount proportional to the minimum rotation angle.

The data collection module may individually collect, for the aligner provided in each of the mirror mount assemblies, an actual unit optical path displacement amount corresponding to a unit optical path displacement amount produced when the drive motor is actually rotated by an actual minimum rotation angle according to a current state of the drive motor, and update the big data.

The data collection module may individually collect the actual unit optical path displacement amount for each of predetermined reference rotation speeds of the drive motor.

The data collection module may individually collect an error between a target unit optical path displacement amount and the actual unit optical path displacement amount for the aligner provided in each of the mirror mount assemblies and updates the big data, the target unit optical path displacement amount corresponding to a unit optical path displacement amount given when the drive motor is virtually rotated by a target minimum rotation angle according to a predetermined design value of the drive motor, and update the big data.

When a predetermined collection condition is satisfied, the data collection module may repeatedly collect the optical path adjustment data including the actual unit optical path displacement amount for the aligner provided in each of the mirror mount assemblies, and update the big data.

The laser nozzle assembly may include a nozzle-side sensing member configured to sense the laser beam transmitted to the laser nozzle and output a nozzle-side sensing signal containing vector information about the machining optical path. The laser apparatus may further include a diagnostic module configured to analyze the nozzle-side sensing signal and diagnose whether distortion has occurred in the machining optical path.

The laser nozzle assembly may further include: a nozzle-side reflective mirror configured to reflect and transmits the laser beam transmitted to the laser nozzle along the machining optical path; and a nozzle-side transport member configured to transport the nozzle-side reflective mirror along a predetermined transport optical path in a reciprocating manner such that the nozzle-side reflective mirror is inserted into or withdrawn from the machining optical path, the nozzle-side transport member guiding selectively guiding the laser beam to a nozzle-side sensing path having a predetermined nozzle-side correlation with the machining optical path, wherein the nozzle-side sensing member may sense the laser beam guided to the nozzle-side sensing optical path and output the nozzle-side sensing signal containing vector information about the nozzle-side sensing optical path, wherein the diagnostic module may diagnose whether distortion has occurred in the machining optical path by analyzing the nozzle-side sensing signal based on the nozzle-side correlation.

Each of the mirror mount assemblies may further include a mount-side sensing member configured to sense the laser beam transmitted to the mirror mount assembly and output a mount-side sensing signal containing vector information about the machining optical path, wherein the diagnostic module may diagnose whether distortion has occurred in the machining optical path by analyzing the mount-side sensing signal.

Each of the mirror mount assemblies may further may include a mount-side transport member configured to transport the mount-side reflective mirror along a predetermined transport optical path in a reciprocating manner such that the mount-side reflective mirror is inserted into or withdrawn from the machining optical path, the mount-side transport member guiding selectively guiding the laser beam to a mount-side sensing path having a predetermined mount-side correlation with the machining optical path, wherein the mount-side sensing member may sense the laser beam guided to the mount-side sensing optical path and output the mount-side sensing signal containing vector information about the mount-side sensing optical path, wherein the diagnostic module may diagnose whether distortion has occurred in the machining optical path by analyzing the mount-side sensing signal based on the mount-side correlation.

When the drive motor of the aligner provided in one of the mirror mount assemblies except the mirror mount assembly located in the last step is intermittently rotated by the actual minimum rotation angle, the data collection module may sense a pattern of adjustment of the machining optical path by the mount-side reflective mirror of the one mirror mount assembly using the mount-side sensing member of the mirror mount assembly located in a step after the one mirror mount assembly among the reference transmission steps, and collect the optical path adjustment data of the aligner provided in the one mirror mount assembly.

When the drive motor of the aligner provided in one of the mirror mount assemblies except the mirror mount assembly located in the last step is intermittently rotated by the actual minimum rotation angle, the data collection module may sense a pattern of adjustment of the optical path by the mount-side reflective mirror of the one mirror mount assembly using the nozzle-side sensing member, and collect final sensor data indicating a pattern of selective adjustment of a position on the object by the aligner provided in the one mirror mount assembly, the laser beam emitted from the laser nozzle being radiated to the position.

When the drive motor of the aligner provided in the mirror mount assembly located in the last step is intermittently rotated by the actual minimum rotation, the data collection module may sense a pattern of adjustment of the machining optical path by the mount-side reflective mirror of the mirror mount assembly located in the last step using the nozzle-side sensing member, and collect the optical path adjustment data of the aligner provided in the mirror mount assembly located in the last step.

The data collection module may separately collect the optical path adjustment data and the final sensor data for each of predetermined reference rotation speeds of the drive motor.

The nozzle-side sensing member may have a nozzle-side sensing surface arranged to allow the laser beam to be radiated thereonto, wherein a coordinate system for specifying a position of a beam spot of the laser beam may be set on the nozzle-side sensing surface.

The diagnostic module may diagnose whether distortion has occurred in the machining optical path based on coordinates of the position of the beam spot of the laser beam radiated onto the nozzle-side sensing surface.

When a distance between a predetermined nozzle-side reference point on the nozzle-side sensing surface and the beam spot exceeds a predetermined reference distance, the diagnostic module may diagnose that distortion has occurred in the machining optical path.

When it is diagnosed that distortion has occurred in the machining optical path, the controller may correct the distortion of the machining optical path by selectively driving the aligner provided in each of at least one mirror mount assembly of the mirror mount assemblies in a driving manner corresponding to a pattern of distortion of the machining optical path based on the big data such that the beam spot is moved to a position where a distance from the nozzle-side reference point is less than or equal to the reference distance.

The laser apparatus may further include a data analysis module configured to search and analyze, when it is diagnosed that distortion has occurred in the machining optical path, the big data based on the coordinates of the position of the beam spot; and derive correction data for correcting the distortion of the machining optical path selectively using the aligner provided in at least one of the mirror mount assemblies, wherein the controller may drive the aligner provided in each of the at least one mirror mount assembly selected according to the correction data from among the mirror mount assemblies in a driving manner according to the correction data to correct the distortion of the machining optical path.

The data collection module may store data about a result of correcting the distortion of the machining optical path based on the correction data in the database to update the big data.

The data analysis module may derive the correction data to move the beam spot along a shortest vector to a position where the distance from the nozzle-side reference point is less than or equal to the reference distance.

The data analysis module may derive the correction data so as to include data about a type and number of aligners used to correct the distortion of the machining optical path among all the aligners provided in the mirror mount assemblies, and a rotation direction, a rotation angle, and a rotation speed of the drive motor provided in each of the aligners used to correct the distortion of the machining optical path.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE INVENTION

Figure 1:
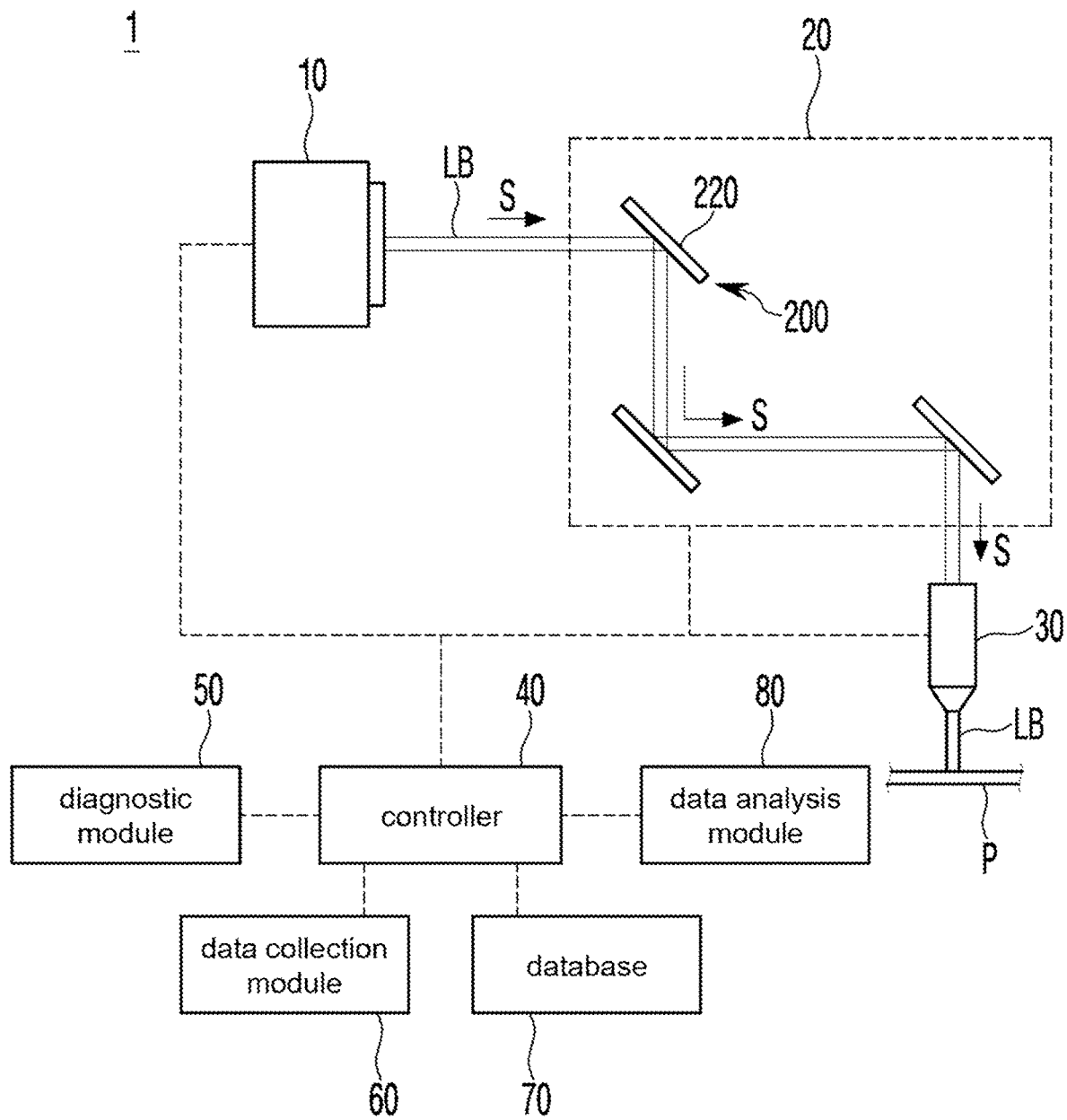
FIG. 1 is a view schematically showing the configuration of a laser apparatus according to an exemplary embodiment of the present disclosure.

Hereinafter, some embodiments of the present disclosure will be described in detail with reference to exemplary drawings. It should be noted that, in assigning reference numerals to elements in the respective drawings, the same elements are assigned the same numerals although they are shown in different drawings. Further, in the following description of embodiments of the present disclosure, a detailed description of known elements or functions incorporated herein may be omitted to avoid obstructing understanding of the embodiments of the present disclosure.

Various terms such as first, second, A, B, (a), (b), etc., may be used solely for the purpose of differentiating one component from the other but neither imply nor suggest the substances, order or sequence of the components. Unless defined otherwise, all terms used herein, including technical or scientific terms, have the same meaning as commonly understood by one of ordinary skill in the art to which this invention belongs. Terms such as those defined in commonly used dictionaries should be interpreted as having a meaning that is consistent with their meaning in the context of this specification and the relevant art and will not be interpreted in an idealized or overly formal sense unless expressly so defined herein.

FIG. 1 is a view schematically showing the configuration of a laser apparatus according to an exemplary embodiment of the present disclosure.

Referring to FIG. 1, a laser apparatus 1 according to the embodiment of the present disclosure may include a laser oscillator 10 configured to generate a laser beam LB, an optical system 20 configured to sequentially transmit the laser beam LB transmitted from the laser oscillator 10 according to predetermined reference transmission steps S and to provide optical path information about the laser beam LB, a laser nozzle assembly 30 configured to condense the laser beam LB transmitted from the optical system 20 and radiate the condensed laser beam LB onto an object P to be processed and to provide optical path information about the laser beam LB, and a controller 40 configured to control overall driving of the laser apparatus 1 based on the optical path information about the laser beam LB to correct optical path distortion of the laser beam LB.

First, the laser oscillator 10 is configured to generate a laser beam LB along a machining optical path $OP_p$. The machining optical path $OP_p$ refers to an optical path along which the laser beam LB generated from the laser oscillator 10 sequentially passes through the optical system 20 and the laser nozzle assembly 30 so as to be radiated onto a predetermined machining point of the object P to be processed. The machining optical path $OP_p$ may be changed according to the alignment of a mount-side reflective mirror 220, which will be described later, and other members that affect the machining optical path $OP_p$.

The laser oscillator 10 is also configured to selectively generate the laser beam LB of any one of machining light $LB_p$ and indicator light $LB_m$, which have different wavelength bands, along the machining optical path $OP_p$. In addition, the laser oscillator 10 may be configured such that the machining light $LB_p$ and the indicator light $LB_m$ have the same optical axis. In this case, the machining light $LB_p$ and the indicator light $LB_m$ generated from the laser oscillator 10 may be transmitted along the same optical path, that is, the machining optical path $OP_p$.

The machining light $LB_p$, is a laser beam LB used for laser machining of the object P to be processed, has a wavelength band absorbed by the object P at an absorption rate greater than or equal to a predetermined reference absorption rate. The type of laser beam that can be used as the machining light $LB_p$ is not particularly limited. At least one of various types of laser beams may be used as the machining light $LB_p$ according to the type of the object P to be processed.

The indicator light $LB_m$, is a laser beam LB for diagnosing the optical path of the laser beam LB, has a wavelength band of visible light, in which a beam spot of the laser beam LB can be visually observed or photographed with a camera. In particular, the indicator light $LB_m$ may have a lower output power than the machining light $LB_p$ such that sensors 260 and 350, which will be described later, are not damaged by the indicator light $LB_m$, but embodiments are not limited thereto. The type of laser beam LB that can be used as the indicator light $LB_m$ is not particularly limited. At least one of various types of laser beams may be used as the indicator light LBm according to the types of the sensors 260 and 350, which will be described later.

The controller 40 may control the laser oscillator 10 to selectively generate one of the machining light $LB_p$ and the indicator light $LB_m$ according to a predetermined process condition. For example, when laser machining is to be performed on the object P to be processed, the controller 40 may control the laser oscillator 10 to generate the machining light $LB_p$. For example, when the optical path of the laser beam LB is to be diagnosed, the controller 40 may control the laser oscillator 10 to generate the indicator light $LB_m$.

While the controller 40 has been described as selectively generating one of the machining light $LB_p$ and the indicator light $LB_m$, embodiments are not limited thereto. That is, the controller 40 may be configured to selectively generate other types of laser beams LB as well as the machining light $LB_p$ and the indicator light $LB_m$.

Next, the optical system 20 is arranged between the laser oscillator 10 and the laser nozzle assembly 30 to allow the laser beam LB generated from the laser oscillator 10 to be transmitted to the laser nozzle assembly 30 along the machining optical path $OP_p$. To this end, as shown in FIG. 1, the optical system 20 may include a mirror mount assembly 200 having a mount-side reflective mirror 220, which will be described later.

The number of mirror mount assemblies 200 to be installed is not particularly limited. For example, the optical system 20 may be provided with a plurality of mirror mount assemblies 200 to sequentially reflect the laser beam LB according to reference transmission steps S using a plurality of mount-side reflective mirrors 220 such that the laser beam LB may be transmitted along the machining optical path $OP_p$. As shown in FIG. 1, the mirror mount assemblies 200 may be disposed in one of the reference transmission steps S. Thereby, the laser beam LB may be sequentially transmitted according to the reference transmission steps S. In addition, each of the mirror mount assemblies 200 may be arranged at a different height to face in a different direction to reflect the laser beam LB using the mount-side reflective mirrors 220, which will be described later, such that extension of the machining optical path $OP_p$ is changed in a predetermined direction. Details of the structure of the mirror mount assemblies 200 will be described later.

Next, the laser nozzle assembly 30 is arranged to radiate the laser beam LB transmitted from the optical system 20 along the machining optical path $OP_p$ onto a predetermined machining point of the object P to be processed. Details of the structure of the laser nozzle assembly 30 will be described later.

Figure 2:
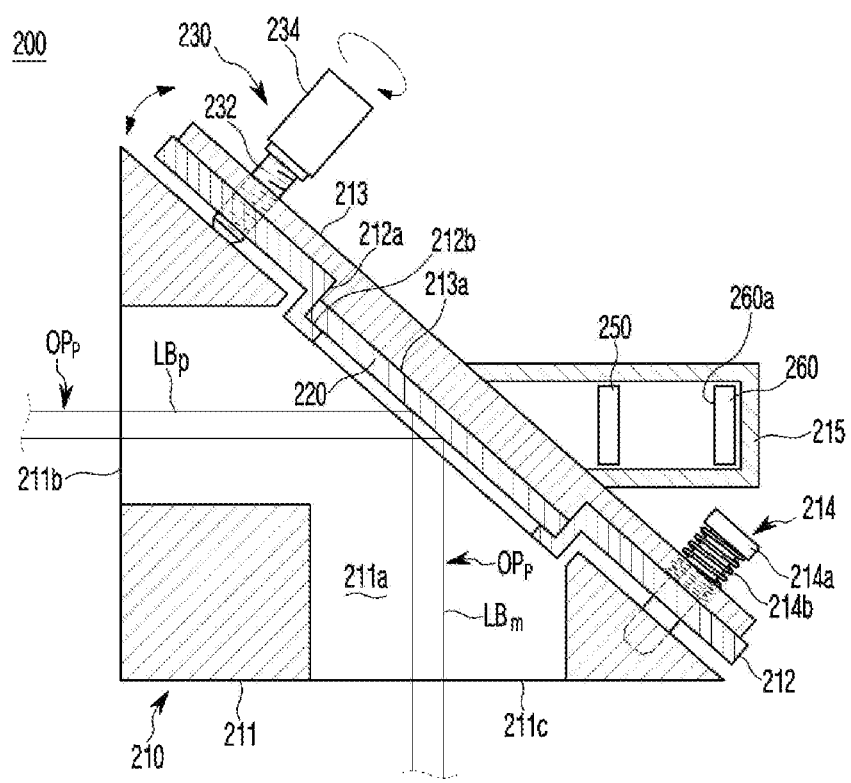
FIG. 2 is a partial cross-sectional view of a mirror mount assembly.
Figure 3:
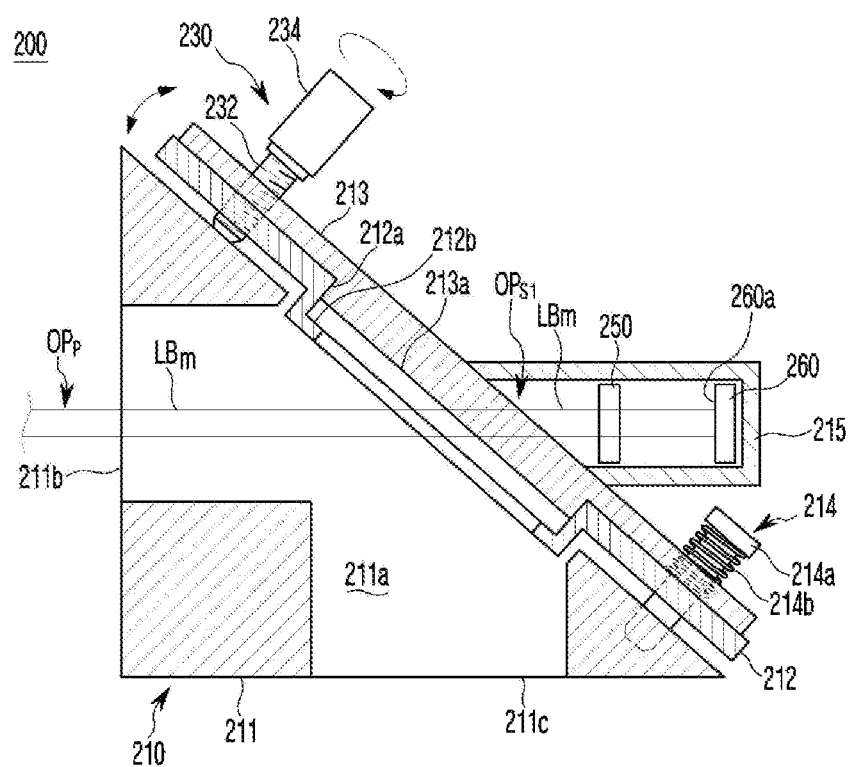
FIG. 3 is a partial cross-sectional view of the mirror mount assembly with a mount-side reflective mirror withdrawn from a machining optical path.

FIG. 2 is a partial cross-sectional view of a mirror mount assembly, and FIG. 3 is a partial cross-sectional view of the mirror mount assembly with a mount-side reflective mirror withdrawn from a machining optical path.

Figure 4:
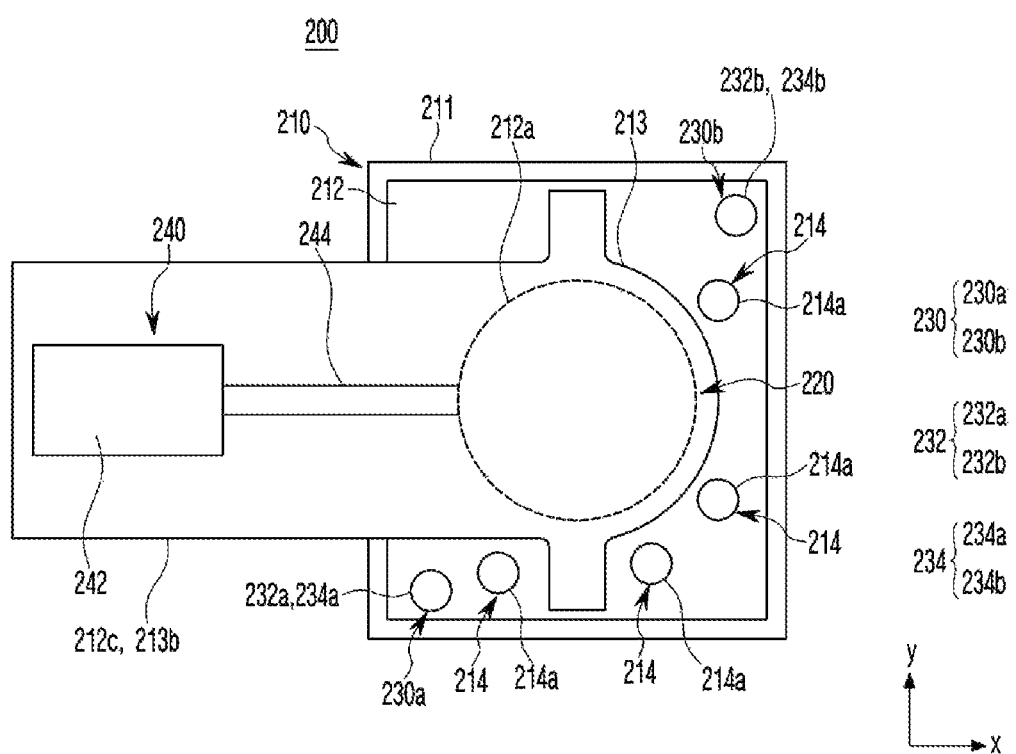
FIG. 4 is a plan view of the mirror mount assembly.
Figure 5:
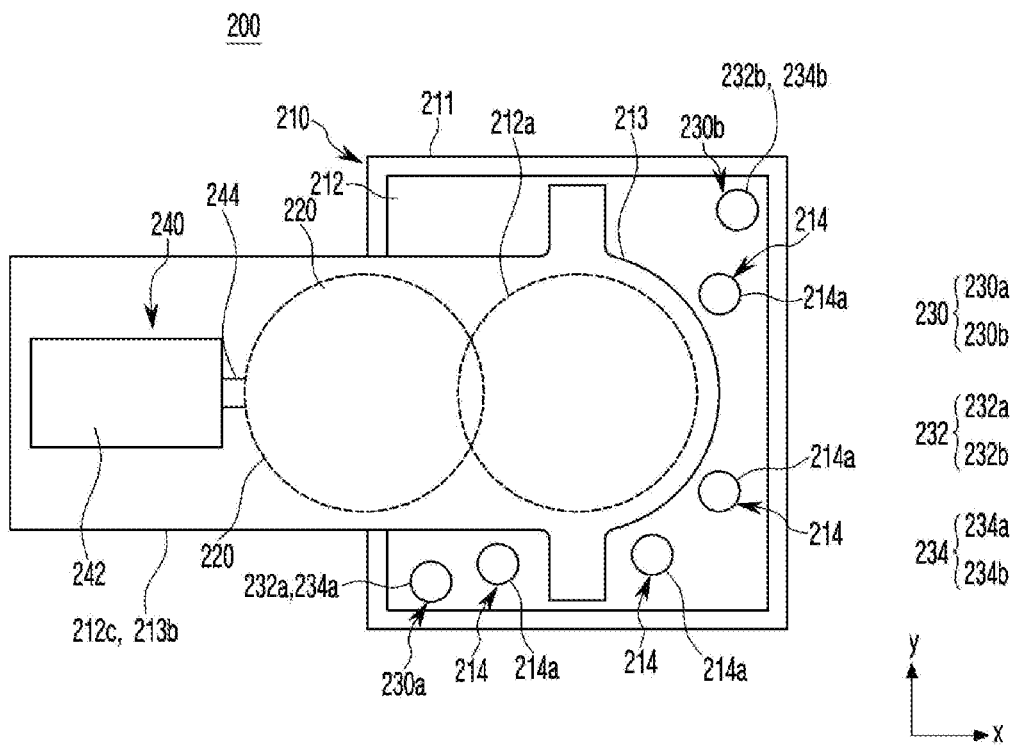
FIG. 5 is a plan view of the mirror mount assembly with the mount-side reflective mirror withdrawn from a machining optical path.

FIG. 4 is a plan view of the mirror mount assembly, and FIG. 5 is a plan view of the mirror mount assembly with the mount-side reflective mirror withdrawn from a machining optical path.

As shown in FIGS. 2 to 5, each of the mirror mount assemblies 200 may have a mirror mount 210, a mount-side reflective mirror 220 configured to reflect the laser beam LB and transmit the same along the machining optical path $OP_p$, an aligner 230 configured to change alignment of the mount-side reflective mirror 220 to adjust a reflection angle of the mount-side reflective mirror 220, a mount-side transport member 240 configured to transport the mount-side reflective mirror 220 along a predetermined transport path in a reciprocating manner to selectively guide the laser beam LB traveling along the machining optical path $OP_p$ to a mount-side sensing optical path $OP_{s1}$, a noise filter 250 configured to remove noise from the laser beam LB traveling along the mount-side sensing optical path $OP_{s1}$, and a mount-side sensor 260 configured to sense the laser beam LB having passed through the noise filter 250 and output a mount-side optical path signal containing vector information about the mount-side sensing optical path $OP_{s1}$.

The mirror mount 210 is arranged to support the mount-side reflective mirror 220 such that the laser beam LB transmitted along the machining optical path $OP_p$ is incident on the mount-side reflective mirror 220. That is, the mirror mount 210 is arranged to support the mount-side reflective mirror 220 such that the laser beam LB transmitted along the machining optical path $OP_p$ from the laser oscillator 10 or the mirror mount assembly 200 located in the transmission step immediately before the mirror mount assembly 200 provided with the mirror mount 210 among the reference transmission steps S is incident on the mount-side reflective mirror 220.

The structure of the mirror mount 210 is not particularly limited. For example, as shown in FIG. 2, the mirror mount 210 may have a base block 211 providing a travel path for the machining light $LB_p$ and other laser beams LB, a mirror plate 212 disposed such that the laser beam LB passing through the base block 211 is incident on the mount-side reflective mirror 220, the mount-side reflective mirror 220 being mounted on the mirror plate 212, a fixing block 213 mounted on the mirror plate 212 to fix the mount-side reflective mirror 220, a fastening member 214 configured to fasten the base block 211 and the mirror plate 212, and a sensor block 215 allowing the mount-side sensor 260 to be installed thereon.

As shown in FIG. 2, the base block 211 may have a laser path 211a formed therein to allow the laser beam LB to travel therethrough. The base block 211 may be fixedly installed at a predetermined position by a bolt or other fixing members. However, embodiments are not limited thereto.

The laser path 211a is not limited to a particular shape, but has a shape corresponding to the machining optical path $O_{P_p}$ of the laser beam LB. For example, as shown in FIG. 2, the laser path 211a may have an 'L' shape when the mount-side reflective mirror 220 is arranged to change the travel direction of the laser beam LB to a vertical direction to change extension of the machining optical path $OP_p$ in the vertical direction. In this case, the laser beam LB transmitted from the laser oscillator 10 or the mirror mount assembly 200 located in the preceding step along the machining optical path $OP_p$ enters the laser path 211a through an opening 211b on one side of the laser path 211a and is incident on the mount-side reflective mirror 220. In addition, the laser beam LB reflected by the mount-side reflective mirror 220 travels along the machining optical path OPp whose extension direction is switched to the vertical direction, and is discharge through an opening 211c on the opposite side of the laser path 211a.

As shown in FIG. 2, the mirror plate 212 may have an opening 212a formed to be open to allow the mount-side reflective mirror 220 to be inserted thereinto, a flange 212b protruding from an inner circumferential surface of the opening 212a to support the mount-side reflective mirror 220 inserted into the opening 212a. The mirror plate 212 may be fastened to one surface of the base block 211 by the fastening member 214, which will be described later.

The opening 212a has a shape corresponding to the mount-side reflective mirror 220 to allow the mount-side reflective mirror 220 to be inserted thereinto. The flange 212b is formed to protrude from the inner lateral surface of the opening 212a by a predetermined length to support the outer peripheral portion of the mount-side reflective mirror 220 inserted into the opening 212a. Accordingly, the mount-side reflective mirror 220 may be detachably mounted on the mirror plate 212 as it is inserted into the opening 212a such that the outer peripheral portion thereof is supported by the flange 212b.

As shown in FIG. 2, the fixing block 213 may have a pressing portion 213a protruding from one side so as to be inserted into the opening 212a. The fixing block 213 may be screwed to one surface of the mirror plate 212 by bolts (not shown). However, embodiments are not limited thereto.

The pressing portion 213a may be formed to protrude from one surface of the fixing block 213 by a predetermined height so as to contact the mount-side reflective mirror 220 inserted into the opening 212a. The pressing portion 213a may press the mount-side reflective mirror 220 inserted into the opening 212a to fix the mount-side reflective mirror 220 in close contact with the flange 212b. Accordingly, the pressing portion 213a may prevent the mount-side reflective mirror 220 from moving inside the opening 212a when external force, vibration, or the like is applied from the outside. In addition, the pressing unit 213a may receive heat applied to the mount-side reflective mirror 220 by the laser beam LB through a contact surface thereof in contact with the mount-side reflective mirror 220. Thereby, the fixing block 213 may dissipate heat transferred from the mount-side reflective mirror 220 to the outside, and prevent the mount-side reflective mirror 220 from being damaged by high-temperature heat.

The fixing block 213 may be configured to allow the indicator light $LB_m$ to be transmitted therethrough and to absorb the machining light $LB_p$. To this end, the fixing block 213 may be formed of glass or a material that selectively allows the indicator light $LB_m$ to be transmitted therethrough. In particular, the incidence surface of the fixing block 213 facing the mount-side reflective mirror 220 and the emitting surface of the fixing block 213 facing the noise filter 250, which will be described later, may be coated with an anti-reflective material to selectively allow the indicator light $LB_m$ to be transmitted therethrough. Thus, as shown in FIG. 3, when the mount-side reflective mirror 220 is withdrawn from the machining optical path $OP_p$ by the mount-side transport member 240, which will be described later, the indicator light $LB_m$ passing through the opening 212a may pass through the fixing block 213 and be guided to the mount-side sensing optical path $OP_{s1}$ so as to travel toward the mount-side sensor 260.

The fastening member 214 is configured to fasten the mirror plate 212 to the base block 211. For example, as shown in FIG. 3, the fastening member 214 includes a fastening bolt 214a having a threaded portion screwed to one surface of the base block 211 through the mirror plate 212, and a spring 214b interposed between the head of fastening bolt 214a and the mirror plate 212. The spring 214b may be a compression coil spring, but is not limited thereto.

The number of fastening members 214 is not particularly limited. For example, as shown in FIG. 4, a plurality of fastening members 214 may be arranged at predetermined intervals.

According to this fastening member 214, the mirror plate 212 is elastically pressed toward one surface of the base block 211 by the elastic force provided from the spring 214b. Thereby, the fastening member 214 may elastically fasten the mirror plate 212 and the base block 211.

As shown in FIG. 3, the sensor block 215 is mounted on one surface of the fixing block 213 such that the indicator light $LB_m$ transmitted through the fixing block 213 may enter the inside thereof. The sensor block 215 may be screwed to the one surface of the fixing block 213 by bolts or other coupling members (not shown). However, embodiments are not limited thereto. Inside the sensor block 215, the noise filter 250, the mount-side sensor 260, and the like, which will be described later, may be arranged at predetermined intervals.

As shown in FIG. 2, the mount-side reflective mirror 220 has a shape corresponding to the opening 212a of the mirror plate 212. The type of reflective mirror usable as the mount-side reflective mirror 220 is not particularly limited, and the mount-side reflective mirror 220 may be configured as a conventional reflective mirror that totally reflects the laser beam.

The mount-side reflective mirror 220 is arranged to enable the laser beam LB transmitted along the machining optical path $OP_p$ from the laser oscillator 10 or the mirror mount assembly 200 located in the preceding step to be totally reflected at a predetermined reflection angle. Thereby, the mount-side reflective mirror may change the extension direction of the machining optical path OPp by the reflection angle of the mount-side reflective mirror 220. For example, as shown in FIG. 2, the mount-side reflective mirror 220 may be arranged to change the extension direction of the machining optical path $OP_p$ to the vertical direction by totally reflecting the laser beam LB. According to the mount-side reflective mirror 220 configured as above, in laser machining of the object P, the machining light $LB_p$ generated from the laser oscillator 10 may be sequentially transmitted according to the reference transmission steps S and delivered to the laser nozzle assembly 30 by the mount-side reflective mirror 220 provided in each of the mirror mount assemblies 200.

The aligner 230 is configured to change the alignment of the mirror mount 210 and the mount-side reflective mirror 220 mounted on the mirror mount 210. The structure of the aligner 230 is not particularly limited. For example, as shown in FIG. 2, the aligner 230 may include a dial 232 mounted on the mirror plate 212 to change the alignment of the mirror plate 212 and the mount-side reflective mirror 220 mounted on the mirror plate 212 according to a rotation direction and rotation angle, and a drive motor 234 configured to rotationally drive the dial 232.

As shown in FIG. 2, the dial 232 may have a bolt shape with a thread formed on the outer circumferential surface thereof. The dial 232 may be screwed to the mirror plate 212 such that an end thereof is pressed to make contact with one surface of the base block 211.

The drive motor 234 may be axially coupled to the dial 232 so as to rotationally drive the dial 232. The type of motor usable as the drive motor 234 is not particularly limited. That is, various types of motors such as an ultrasonic motor, a servo motor, and a stepper motor may be used as the drive motor 234.

When the dial 232 is rotationally driven by the drive motor 234, the mirror plate 212 may be gradually moved to approach or be spaced apart from the base block 211 by a predetermined distance according to the rotation direction and rotation angle of the dial 232. In this way, the aligner 230 may change the angle between the base block 211 and the mirror plate 212 with respect to the fastening member 214, thereby changing the alignment of the mirror plate 212 and the mount-side reflective mirror 220 mounted thereon. Then, the reflection angle of the mount-side reflective mirror 220 with respect to the laser beam LB may be adjusted according to the driving method of the aligner 230, and the optical path of the laser beam LB including the machining optical path $OP_p$ and the mount-side sensing optical path $OP_{s1}$ may be adjusted according to the driving method of the aligner 230.

The number of aligners 230 is not particularly limited. For example, as shown in FIG. 4, the aligner 230 may be provided in pair, including a first aligner 230a configured to change the angle between the base block 211 and the mirror plate 212 about the Y axis to move the optical path of the laser beam LB including the machining optical path $OP_p$ and the mount-side sensing optical path $OP_{s1}$, which will be described later, in the X-axis direction perpendicular to the Y-axis direction, and a second aligner 230b configured to change the angle between the base block 211 and the mirror plate 212 about the X-axis to move the optical path of the laser beam LB including the machining optical path $OP_p$ and the mount-side sensing optical path $OP_{s1}$ in the Y-axis direction.

The first aligner 230a may include a first dial 232a configured to change the angle between the base block 211 and the mirror plate 212 about the Y axis according to the rotation direction and the rotation angle to move the optical path of the laser beam LB toward the X axis, and a first drive motor 234a configured to rotationally drive the first dial 232a.

The second aligner 230b may include a second dial 232b configured to change the angle between the base block 211 and the mirror plate 212 about the X axis according to the rotation direction and the rotation angle to move the optical path of the laser beam LB toward the Y axis, and a second drive motor 234b configured to rotationally drive the second dial 232b.

According to the first aligner 230a and the second aligner 230b configured as above, the optical path of the laser beam LB may be individually adjusted toward each of the X axis and the Y axis according to how the first aligner 230a and the second aligner 230b are driven.

The mount-side transport member 240 is configured to transport the mount-side reflective mirror 220 along a predetermined transport path in a reciprocating manner such that the mount-side reflective mirror 220 is put into the machining optical path $OP_p$ or withdrawn from the machining optical path $OP_p$. The type of the transport member usable as the mount-side transport member 240 is not particularly limited. For example, the mount-side transport member 240 may be configured as a cylinder device. In this case, as shown in FIG. 4, the mount-side transport member 240 may have a cylinder body 242 configured to provide driving force, and a cylinder rod 244 configured to be transported along a predetermined transport path in a reciprocating manner by the cylinder body 242 to be coupled to the mount-side reflective mirror 220.

The transport path of the mount-side reflective mirror 220 is determined such that the mount-side reflective mirror 220 is inserted into the machining optical path $OP_p$ or withdrawn from the machining optical path $OP_p$, and that the sensor block 15 and the noise filter 250 and the mount-side sensor 260 installed therein do not interfere with the mount-side reflective mirror 220. For example, as shown in FIGS. 4 and 5, the transport path of the mount-side reflective mirror 220 may be determined to transport the mount-side reflective mirror 220 in the width direction in a reciprocating manner. To this end, the mirror plate 212 may have an expanded portion 212c expanded in the transport direction of the mount-side reflective mirror 220 (e.g., the width direction of the mount-side reflective mirror 220). Correspondingly, the fixing block 213 may have an expanded portion 213b expanded in the transport direction of the mount-side reflective mirror 220 (e.g., the width direction of the mount-side reflective mirror 220). The expanded portions 212c and 213b may be arranged such that a movement passage communicating with the opening 212a of the mirror plate 212 to allow the mount-side reflective mirror 220 to move along a predetermined transport path and an installation space for installation of the mount-side transport member 240 are formed between the expanded portions 212c and 213b.

When the mount-side transport member 240 is installed and the expanded portions 212c and 213b are arranged as described above, the mount-side reflective mirror 220 may be selectively inserted into or withdrawn from the machining optical path $OP_p$ using the mount-side transport member 240 according to the driving mode of the laser apparatus 1.

For example, as shown in FIGS. 2 and 4, when the machining light $LB_p$ is generated from the laser oscillator 10 for laser machining of the object P to be processed, the mount-side transport member 240 may insert the mount-side reflective mirror 220 into the machining optical path $OP_p$. Then, the mount-side reflective mirror 220 may divert the extension direction of the machining optical path $OP_p$ by the reflection angle of the mount-side reflective mirror 220 by totally reflecting the machining light $LB_p$ transmitted along the machining optical path $OP_p$.

For example, as shown in FIGS. 3 and 5, when the indicator light $LB_m$ is generated from the laser oscillator 10 for diagnosis of the optical path of the laser beam LB, the mount-side transport member 240 may withdraw the mount-side reflective mirror 220 from the machining optical path $OP_p$. Then, as shown in FIG. 3, the indicator light $LB_m$ transmitted to the mirror mount assembly 200 along the machining optical path $OP_p$ is transmitted through the fixing block 213 and is guided to the mount-side sensing optical path $OP_{s1}$. Here, the mount-side sensing optical path $OP_{s1}$ refers to an optical path which the indicator light $LB_m$ transmitted through the fixing block 213 enters without being reflected by the mount-side reflective mirror 220. The mount-side sensing optical path $OP_{s1}$ has a first predetermined correlation with the machining optical path $OP_p$. For example, as shown in FIGS. 2 and 3, the mount-side sensing optical path $OP_{s1}$ is aligned with the machining optical path $OP_p$ on a straight line in a section before the extension direction is changed by the mount-side reflective mirror 220. In a section after the extension direction is changed by a predetermined reflection angle by the mount-side reflective mirror 220, the mount-side sensing optical path $OP_{s1}$ and the machining optical path $OP_p$ form the same angle as the reflection angle of the mount-side reflective mirror 220.

As shown in FIG. 3, the noise filter 250 is disposed between the fixing block 213 and the mount-side sensor 260 such that the indicator light $LB_m$ transmitted through fixing block 213 and guided to the mount-side sensing optical path $OP_{s1}$ to enter the filter. The noise filter 250 may remove noise included in the indicator light $LB_m$ such that the indicator light $LB_m$ may be formed into a shape suitable for diagnosis of the optical path of the laser beam LB. The noise filter 250 may transmit the indicator light $LB_m$ guided to the mount-side sensing optical path $OP_{s1}$ to the mount-side sensor 260 with the noise removed therefrom, thereby preventing noise from causing errors in the diagnosis of the optical path of the laser beam LB.

The mount-side sensor 260 may sense the indicator light $LB_m$ from which noise has been removed by the noise filter 250, and output a mount-side optical path signal containing vector information about the mount-side sensing optical path $OP_{s1}$. The mount-side optical path signal may contain position coordinates of the mount-side sensing optical path $OP_{s1}$, an extension direction of the mount-side sensing optical path $OP_{s1}$, and vector information about the mount-side sensing optical path $OP_{s1}$. As shown in FIG. 3, the mount-side sensor 260 may be provided with a mount-side sensing surface 260a to receive the indicator light $LB_m$ passing through the noise filter 250 and radiated thereonto to sense the indicator light $LB_m$.

Figure 6:
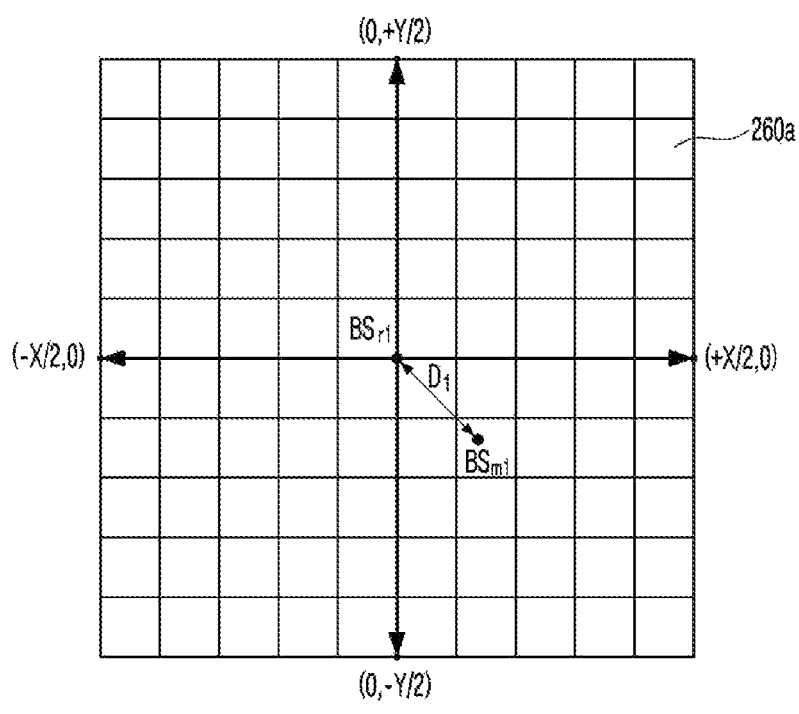
FIG. 6 illustrates a method of deriving a mount-side sensing optical path using a mount-side sensor.
Figure 7:
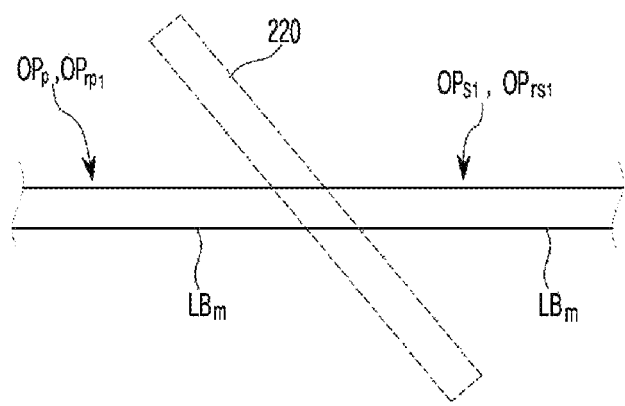
FIG. 7 illustrates a machining optical path and a mount-side sensing optical path formed when a laser beam is transmitted to the mirror mount assembly without optical path distortion.
Figure 8:
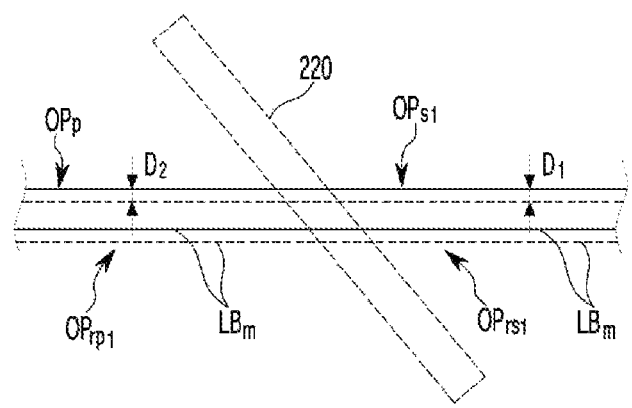
FIG. 8 illustrates a machining optical path and a mount-side sensing optical path formed when a laser beam is transmitted to the mirror mount assembly while undergoing optical path distortion.

FIG. 6 illustrates a method of deriving a mount-side sensing optical path using a mount-side sensor, FIG. 7 illustrates a machining optical path and a mount-side sensing optical path formed when a laser beam is transmitted to the mirror mount assembly without optical path distortion, and FIG. 8 illustrates a machining optical path and a mount-side sensing optical path formed when a laser beam is transmitted to the mirror mount assembly while undergoing optical path distortion.

As shown in FIG. 6, the mount-side sensor 260 may be configured to sense the position of a mount-side test beam spot $BS_{m1}$ of the indicator light $LB_m$ radiated onto the mount-side sensing surface 260a. The mount-side sensing surface 260a may be configured as a 2D planar surface having a predetermined sensing area. An XY coordinate systems capable of specifying the position coordinates of the mount-side test beam spot $BS_{m1}$ on the mount-side sensing surface 260a may be set on the mount-side sensing surface 260a.

In order to sense the position coordinates of the mount-side test beam spot $BS_{m1}$, the mount-side sensor 260 may include at least one of a camera configured to capture an image of the mount-side test beam spot $BS_{m1}$, a PSD sensor configured to output a position detection signal corresponding to the position of the mount-side test beam spot $BS_{m1}$, or various sensors capable of providing information on the position of the mount-side test beam spot $BS_{m1}$. In particular, when the mount-side sensor 260 has a camera, a CCD camera may be employed as the camera. However, embodiments are not limited thereto.

The mount-side optical path signal output from the mount-side sensor 260 may be used for diagnosis of the optical path of the laser beam LB. To this end, as shown in FIG. 1, the laser apparatus 1 may further include a diagnostic module 50 configured to analyze the mount-side optical path signal output from the mount-side sensor 260 to perform optical path diagnosis for the laser beam LB.

Referring to FIG. 6, the diagnostic module 50 may derive a vector of the mount-side sensing optical path $OP_{s1}$ with respect to the position of the mount-side test beam spot $BS_{m1}$ sensed by the mount-side sensor 260, and then calculate an optical path difference $D_1$ between the mount-side sensing optical path $OP_{s1}$ and a predetermined first reference sensing optical path $OP_{rs1}$. In particular, the diagnostic module 50 may calculate the optical path difference $D_1$ between the mount-side sensing optical path $OP_{s1}$ and the first reference sensing optical path $OP_{rs1}$, using the difference between the position coordinates of the mount-side test beam spot $BS_{m1}$ radiated onto the mount-side sensing surface 260a along the mount-side sensing optical path $OP_{s1}$ and the position coordinates of the mount-side reference beam spot $BS_{r1}$ radiated onto the mount-side sensing surface 260a along the first reference sensing optical path $OP_{rs1}$.

Here, the first reference sensing optical path $OP_{rs1}$ refers to a mount-side sensing optical path $OP_{s1}$ given when the laser beam LB is transmitted along the predetermined first reference machining optical path $OP_{rp1}$ from the laser oscillator 10 or the mount-side reflective mirror 220 of the mirror mount assembly 200 located in the immediately preceding step. In addition, the first reference machining optical path $OP_{rp1}$ refers to a machining optical path $OP_p$ along which the laser beam LB transmitted from the laser oscillator 10 or the mount-side reflective mirror 220 of the mirror mount assembly 200 located in the immediately preceding step travels when no optical path distortion occurs. As described above, the mount-side sensing optical path $OP_{s1}$ has the first correlation with the machining optical path $OP_p$. Accordingly, the first reference sensing optical path $OP_{rs1}$ may also be set to have the first correlation with the first reference machining optical path $OP_{rp1}$. Then, the position coordinates of the mount-side reference beam spot $BS_{r1}$ may function as a mount-side reference point in diagnosing whether the optical path distortion of the laser beam LB occurs using the position coordinates of the mount-side test beam spot $BS_{m1}$.

As shown in FIG. 7, when the indicator light $LB_m$ is transmitted along the machining optical path $OP_p$ coinciding with the first reference machining optical path $OP_{rp1}$, the mount-side sensing optical path $OP_{s1}$ coincides with the first reference sensing optical path $OP_{rs1}$. In addition, as shown in FIG. 8, when the indicator light LB is transmitted along the machining optical path $OP_p$ deviated by a predetermined optical path difference $D_2$ from the first reference machining optical path $OP_{rp1}$, the mount-side sensing optical path $OP_{s1}$ and the first reference sensing optical path $OP_{rs1}$ differs from each other as much as the optical path difference $D_1$, which is proportional to the optical path difference $D_2$ between the machining optical path $OP_p$ and the first reference machining optical path $OP_{rp1}$.

The diagnostic module 50 may derive the vector of the machining optical path $OP_p$ by analyzing the vector of the mount-side sensing optical path $OP_{s1}$ based on the first correlation relationship. The vector of the machining optical path $OP_p$ derived as described above may include the position coordinates of the machining optical path $OP_p$, an extension direction of the machining optical path $OP_p$, and various kinds of other data about the machining optical path $OP_p$. Accordingly, the diagnostic module 50 may calculate the optical path difference $D_2$ between the machining optical path $OP_p$ and the first reference machining optical path $OP_{rp1}$ based on the optical path difference $D_1$ between the mount-side sensing optical path $OP_{s1}$ and the first reference sensing optical path $OP_{rs1}$. The optical path difference $D_2$ calculated as described above may correspond to the value of the vector representing the magnitude and direction of the optical path distortion occurring in the process of transmitting the laser beam LB along the machining optical path $OP_p$ leading up to the mount-side mirror assembly 200 where optical path diagnosis is performed.

As described above, the mirror mount assemblies 200 are disposed to sequentially transmit the laser beam LB generated from the laser oscillator 10 according to the reference transmission steps S using the mount-side reflective mirrors 220. Accordingly, the indicator light $LB_m$ generated from the laser oscillator 10 is transmitted along the machining optical path $OP_p$ to the mirror mount assembly 200 located in the first step of the reference transmission steps S among the mirror mount assemblies 200. In addition, the indicator light $LB_m$ reflected by the mount-side reflective mirror 220 of the mirror mount assembly 200 located in the immediately preceding step is transmitted along the machining optical path $OP_p$ to the mirror mount assembly 200 located in the second or later step of the reference transmission steps S among the mirror mount assemblies 200.

In consideration of the transmission aspect of the indicator light $LB_m$, the diagnostic module 50 may determine whether the indicator light $LB_m$ is normally transmitted along the first reference machining optical path $OP_{rp1}$ without optical path distortion for each of the mirror mount assemblies 200, based on the vector of the machining optical path $OP_p$, the optical path difference $D_2$, and the like.

As described above, since the laser oscillator 10 generates laser beams LB such as the machining light $LB_p$ and the indicator light $LB_m$ such that the laser beams have the same optical axis, the laser beams LB generated from the laser oscillator 10 are transmitted along the same machining optical path $OP_p$. Thus, the diagnostic module 50, may determine, for each of the mirror mount assemblies 200, whether the laser beam LB is transmitted from the laser oscillator 10 or the mirror mount assembly 200 located in the immediately preceding step along the first reference machining optical path $OP_{rp1}$, based on the path vector of the machining optical path $OP_p$, the optical path difference $D_2$, and the like.

For example, when the diagnostic module 50 diagnose the optical path of the laser beam LB for the mirror mount assembly 200 located in the first step, and the machining optical path $OP_p$ and the first reference machining optical path $OP_{rp1}$ do not coincide with each other, the diagnostic module 50 may diagnostically determine that distortion of the machining optical path $OP_p$ is occurring due to abnormality during transmission of the laser beam LB to the mirror mount assembly 200 located in the first step. The abnormality refers to poor alignment of the laser oscillator 10, and other effects causing distortion of the machining optical path $OP_p$ during transmission of the laser beam LB to the mirror mount assembly 200 located in the first step.

For example, when the diagnostic module 50 diagnose the optical path of the laser beam LB for the mirror mount assembly 200 located in the later step, and the machining optical path $OP_p$ and the first reference machining optical path $OP_{rp1}$ do not coincide with each other, the diagnostic module 50 may determine that distortion of the machining optical path $OP_p$ is occurring during transmission of the laser beam LB to the mirror mount assembly 200 located in the later step. The abnormality refers to poor alignment of the laser oscillator 10, poor alignment of the mount-side reflective mirror 220 of the mirror mount assembly 200 located in the immediately preceding reference transmission step S before the later step, and other effects causing distortion of the machining optical path OPp during transmission of the laser beam LB to the mirror mount assembly 200 located in the later step.

When the optical path difference $D_2$ between the machining optical path $OP_p$ and the first reference machining optical path $OP_{rp1}$ exceeds a predetermined reference optical path difference, the diagnostic module 50 may diagnose discrepancy between the machining optical path $OP_p$ and the first reference machining optical path $OP_{rp1}$. It is difficult to physically completely eliminate optical path distortion due to tolerances in the manufacturing process and errors in the assembly process. Accordingly, only when the optical path difference $D_2$ between the machining optical path $OP_p$ and the first reference machining optical path $OP_{rp1}$ is as large as to adversely affect the machining quality of the object P due to the distortion of the machining optical path $OP_p$, discrepancy between the machining optical path $OP_p$ and the first reference machining optical path $OP_{rp1}$ is diagnosed.

As described above, the diagnostic module 50 may detect a member causing distortion of the machining optical path $OP_p$ by performing optical path diagnosis of the laser beam LB for each of the mirror mount assemblies 200. However, according to the above-described diagnosis method, distortion of the machining optical path $OP_p$ occurring in the mirror mount assembly 200 located in a specific step of the reference transmission steps S may be diagnosed using the mount-side sensor 260 of the mirror mount assembly 200 located in a step later than the specific step among the reference transmission steps S (preferably in the step immediately after the specific step). Accordingly, according to the above-described diagnosis method, distortion of the machining optical path $OP_p$ occurring in the mirror mount assembly 200 located in the last step of the reference transmission steps S cannot be detected. A method of detecting the distortion of the machining optical path $OP_p$ occurring in the mirror mount assembly 200 located in the last step will be described later.

Figure 9:
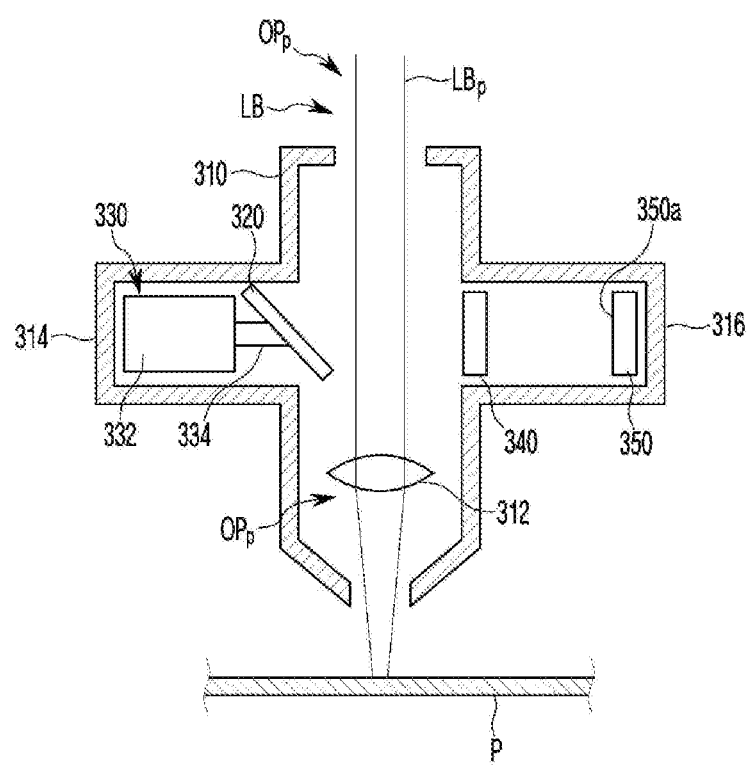
FIG. 9 is a partial cross-sectional view schematically showing the configuration of a laser nozzle assembly.
Figure 10:
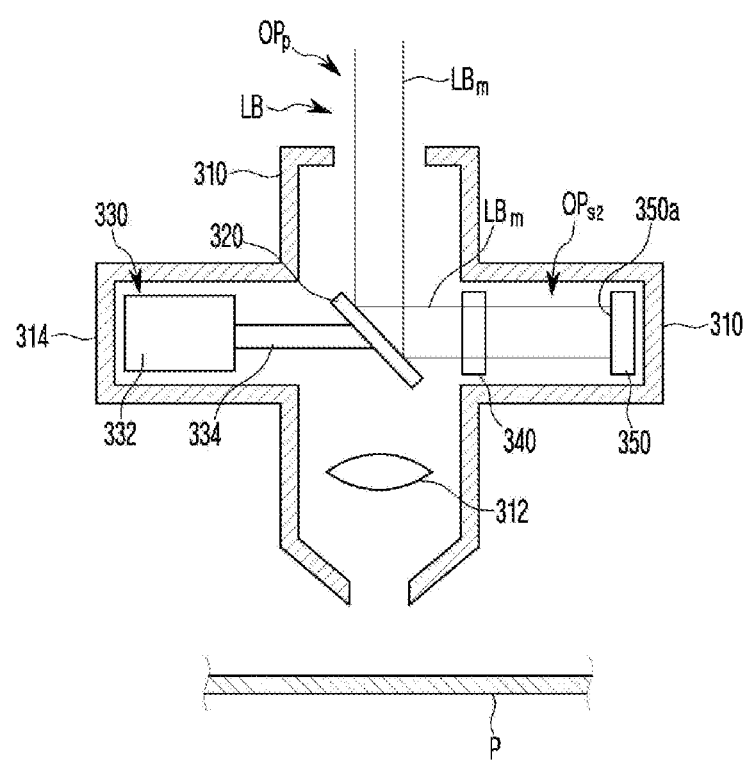
FIG. 10 is a partial cross-sectional view showing a nozzle-side reflective mirror of FIG. 9 inserted into a machining optical path.

FIG. 9 is a partial cross-sectional view schematically showing the configuration of a laser nozzle assembly, and FIG. 10 is a partial cross-sectional view showing a nozzle-side reflective mirror of FIG. 9 inserted into a machining optical path.

As shown in FIG. 9, the laser nozzle assembly 30 may include a laser nozzle 310, a nozzle-side reflective mirror 320 configured to selectively guide a laser beam LB transmitted along the machining optical path $OP_p$ to a nozzle-side sensing optical path $OP_{s2}$, a nozzle-side transport member 330 configured to transport a nozzle-side reflective mirror 320 along a predetermined path in a reciprocating manner such that the nozzle-side reflective mirror 320 is inserted into or withdrawn from the machining optical path $OP_p$, a noise filter 340 configured to remove noise included in the laser beam LB traveling along the nozzle-side sensing optical path $OP_{s2}$, and a nozzle-side sensor 350 configured to sense the laser beam LB with the noise removed therefrom by the noise filter 340 and to output a nozzle-side optical path signal containing vector information about the nozzle-side sensing optical path $OP_{s2}$.

As shown in FIG. 9, the laser nozzle 310 has a hollow shape allowing the laser beam LB transmitted along the machining optical path $OP_p$ from the mount-side reflective mirror 220 of the mirror mount assembly 200 located in the last step to enter the inside thereof. The laser nozzle 310 may have a condensing lens 312 capable of condensing the laser beam LB that enters the laser nozzle. As shown in FIG. 9, the condensing lens 312 may be arranged to condense the laser beam LB having traveled without being reflected by the nozzle-side reflective mirror 320, which will be described later. However, embodiments are not limited thereto. That is, when the laser nozzle 310 is arranged such that the laser beam LB reflected by the nozzle-side reflective mirror 320 is radiated onto the object P to be processed, the condensing lens 312 may be arranged to condense the laser beam LB reflected by the nozzle-side reflective mirror 320. Hereinafter, for simplicity, the present disclosure will be described on the basis of a case where the condensing lens 312 is arranged such that the laser beam LB traveling without being reflected by the nozzle side reflective mirror 320 is incident.

The laser nozzle 310 may further include a beam expander (not shown) provided to expand the diameter of the laser beam LB entering the laser nozzle 310 at a predetermined ratio and transmit the laser beam LB to the condensing lens 312, and various optical members (not shown) capable of shaping the laser beam LB according to the machining purpose of the object P.

As shown in FIG. 9, the laser nozzle 310 may radiate the machining light $LB_p$ condensed by the condensing lens 312 to a predetermined machining point on the object P along the machining optical path $OP_p$ to perform laser machining of the object P.

The nozzle-side reflective mirror 320 is provided inside the laser nozzle 310 such that the laser beam LB entering the laser nozzle 310 along the machining optical path $OP_p$ is incident thereon, and is arranged to totally reflect the laser beam LB by a predetermined reflection angle. For example, as shown in FIG. 10, the nozzle-side reflective mirror 320 may be arranged to totally reflect the laser beam LB entering the laser nozzle 310 along the machining optical path $OP_p$ such that the traveling direction of the laser beam LB is changed to the vertical direction. Reflective mirrors usable as the nozzle-side reflective mirror 320 are not particularly limited. The nozzle-side reflective mirror 320 may be configured as a conventional reflective mirror that totally reflects the laser beam.

As shown in FIG. 10, the nozzle-side reflective mirror 320 may be arranged closer to the optical system 20 than to the condensing lens 312 such that the laser beam LB that has not reached the condensing lens 312 is incident thereon. However, embodiments are not limited thereto.

The nozzle-side transport member 330 is arranged to transport the nozzle-side reflective mirror 320 in a reciprocating manner along a predetermined transport path such that the nozzle-side reflective mirror 320 is inserted into or withdrawn from the machining optical path $OP_p$. Types of transport members usable as the nozzle-side transport member 330 are not particularly limited. For example, a cylinder device may be configured as the nozzle-side transport member 330. In this case, as shown in FIGS. 9 and 10, the nozzle-side transport member 330 may have a cylinder body 332 configured to provide driving force, and a cylinder rod 334 configured to be transported along a predetermined transport path in a reciprocating manner by the cylinder body 332 to be coupled to the nozzle-side reflective mirror 320.

The transport path of the nozzle-side reflective mirror 320 is determined such that the nozzle-side reflective mirror 320 is inserted into the machining optical path $OP_p$ or withdrawn from the machining optical path $OP_p$, and that the noise filter 340 and the nozzle-side sensor 350, which will be described later, do not interfere with the nozzle-side reflective mirror 320. For example, as shown in FIGS. 9 and 10, the transport path of the nozzle-side reflective mirror 320 may be determined to transport the nozzle-side reflective mirror 320 in a horizontal direction of the laser nozzle 310 in a reciprocating manner. To this end, a first expanded portion 314 expanded in the transport direction of the nozzle-side reflective mirror 320 (e.g., the horizontal direction of the laser nozzle 310) may be provided on one side wall of the laser nozzle 310. The first expanded portion 314 has a predetermined volume such that a movement passage communicating with the inside of the laser nozzle 310 to allow the nozzle-side reflective mirror 320 to move along a predetermined transport path and an installation space for installation of the nozzle-side transport member 330 are formed inside the first expanded portion 314.

In addition, a second expanded portion 316 expanded in a predetermined extension direction in correspondence with the first expanded portion 314 may be provided on the other side wall of the laser nozzle 310 opposite to the one side wall of the laser nozzle 310. The extension direction of the second expanded portion 316 is not particularly limited. When the nozzle-side sensor 350 is configured to sense the laser beam LB totally reflected by the nozzle-side reflective mirror 320, the second expanded portion 316 may be formed to extend in a traveling direction of the laser beam LB reflected by the nozzle-side reflective mirror 320. For example, as shown in FIG. 10, when the nozzle-side reflective mirror 320 is configured to change the traveling direction of the laser beam LB to a vertical direction, the second expanded portion 316 may be extended in the horizontal direction of the laser nozzle 310. Inside the second expanded portion 316, the noise filter 340, the nozzle-side sensor 350, and the like, which will be described later, may be disposed at predetermined intervals.

When the nozzle-side transport member 330 is installed and the first expanded portion 314 is provided as described above, the nozzle-side reflective mirror 320 may be selectively inserted into or withdrawn from the machining optical path $OP_p$ using the nozzle-side transport member 330 according to the driving mode of the laser apparatus 1.

For example, as shown in FIG. 9, when the machining light $LB_p$ is generated from the laser oscillator 10 for laser machining of the object P to be processed, the nozzle-side transport member 330 may withdraw the reflective mirror 320 from the machining optical path $OP_p$. Then, as shown in FIG. 9, the machining light $LB_p$ may travel along the machining optical path $OP_p$ without being reflected by the nozzle-side reflective mirror 320, and then be radiated to a predetermined machining point on the object P to be processed.

For example, as shown in FIG. 10, when the indicator light $LB_m$ is generated from the laser oscillator 10 for diagnosis of the optical path of the laser beam LB, the nozzle-side transport member 330 may withdraw the nozzle-side reflective mirror 320 from the machining optical path $OP_p$. Then, as shown in FIG. 10, the laser beam LB transmitted along the machining optical path $OP_p$ is totally reflected by the nozzle-side reflective mirror 320 and guided to the nozzle-side sensing optical path $OP_{s2}$. The nozzle-side sensing optical path $OP_{s2}$ is an optical path into which the indicator light $LB_m$ is totally reflected and introduced such that the traveling direction of the indicator light $LB_m$ is changed by a predetermined reflection angle by the nozzle-side reflective mirror 320. Accordingly, the nozzle-side sensing optical path $OP_{s2}$ has a second predetermined correlation with the machining optical path $OP_p$. For example, as shown in FIG. 10, when the nozzle-side reflective mirror 320 is arranged to change the traveling direction of the laser beam LB to a vertical direction, the nozzle-side sensing optical path $OP_{s2}$ is perpendicular to the machining optical path $OP_p$.

As shown in FIG. 10, the noise filter 340 is arranged between the nozzle-side reflective mirror 320 and the nozzle-side sensor 350 to allow the indicator light $LB_m$ guided to the nozzle-side sensing optical path $OP_{s2}$ to be incident thereon, and is positioned inside the second expanded portion 316. The noise filter 340 may remove noise included in the indicator light $LB_m$ such that the indicator light $LB_m$ may be shaped to be suitable for diagnosis of the optical path of the laser beam LB. The noise filter 340 may transmit the indicator light $LB_m$ guided to the nozzle-side sensing optical path $OP_{s2}$ to the nozzle-side sensor 350 with the noise removed therefrom, thereby preventing noise from causing errors in the diagnosis of the optical path of the laser beam LB.

The nozzle-side sensor 350 may sense the indicator light $LB_m$ from which noise has been removed by the noise filter 340, and output a nozzle-side optical path signal containing vector information about the nozzle-side sensing optical path $OP_{s2}$. The nozzle-side optical path signal may contain position coordinates of the nozzle-side sensing optical path $OP_{s2}$, an extension direction of the nozzle-side sensing optical path $OP_{s2}$, and vector information about the nozzle-side sensing optical path $OP_{s2}$. As shown in FIG. 10, the nozzle-side sensor 350 may be provided with a nozzle-side sensing surface 350a to receive the indicator light $LB_m$ passing through the noise filter 340 and radiated thereonto to sense the indicator light $LB_m$.

Figure 11:
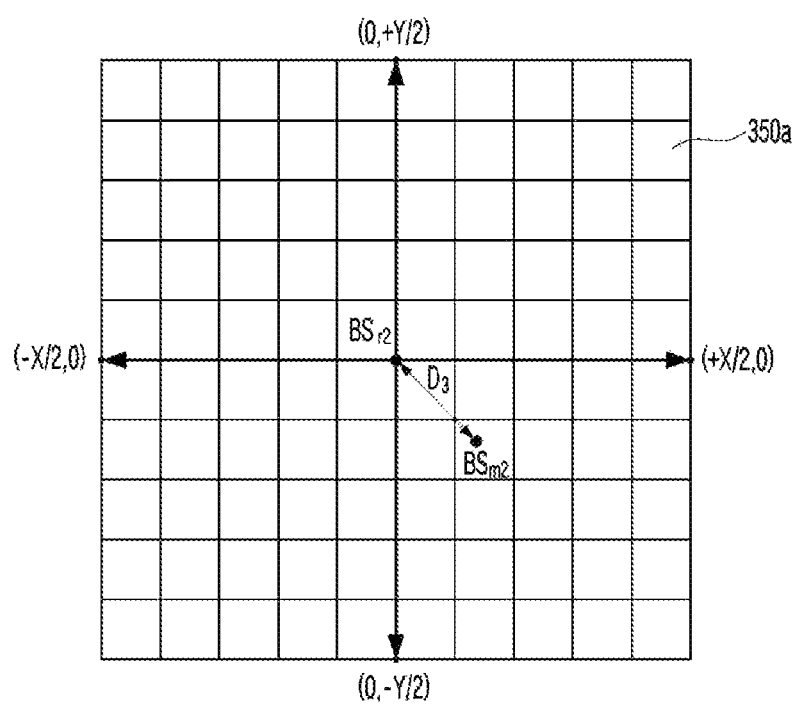
FIG. 11 illustrates a method of deriving a nozzle-side sensing optical path using a nozzle-side sensor.
Figure 12:
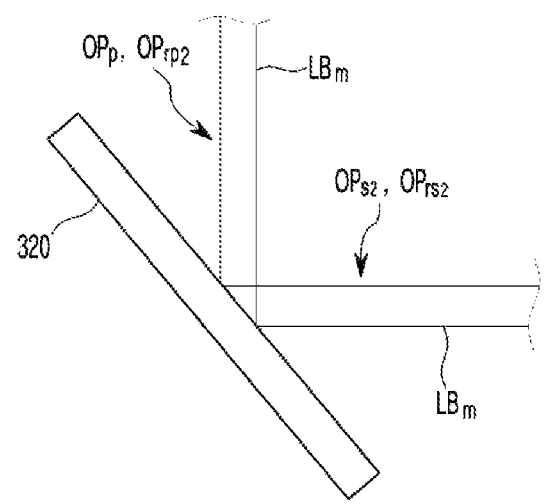
FIG. 12 illustrates a machining optical path and a nozzle-side sensing optical path formed when a laser beam is transmitted to the laser nozzle assembly without optical path distortion.
Figure 13:
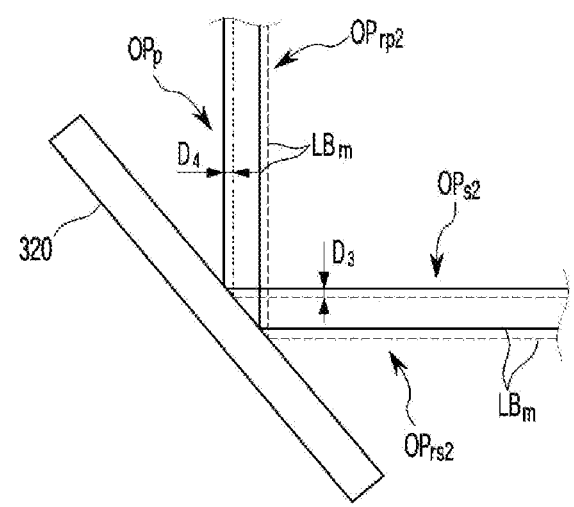
FIG. 13 illustrates a machining optical path and a nozzle-side sensing optical path formed when a laser beam is transmitted to the laser nozzle assembly while undergoing optical path distortion.

FIG. 11 illustrates a method of deriving a nozzle-side sensing optical path using a nozzle-side sensor, and FIG. 12 illustrates a machining optical path and a nozzle-side sensing optical path formed when a laser beam is transmitted to the laser nozzle assembly without optical path distortion. FIG. 13 illustrates a machining optical path and a nozzle-side sensing optical path formed when a laser beam is transmitted to the laser nozzle assembly while undergoing optical path distortion.

As shown in FIG. 11, the nozzle-side sensor 350 may be configured to sense the position of a nozzle-side test beam spot $BS_{m2}$ of the indicator light $LB_m$ radiated onto the nozzle-side sensing surface 350a. Here, the nozzle-side sensing surface 350a of the nozzle-side sensor 350 may be configured as a 2D planar surface having a predetermined sensing area. An XY coordinate systems capable of specifying the position coordinates of the nozzle-side test beam spot $BS_{m2}$ on the nozzle-side sensing surface 350a may be set on the nozzle-side sensing surface 350a.

In order to sense the position coordinates of the nozzle-side test beam spot $BS_{m2}$, the nozzle-side sensor 350 may include at least one of a camera configured to capture an image of the nozzle-side test beam spot $BS_{m2}$, a PSD sensor configured to output a position detection signal corresponding to the position of the nozzle-side test beam spot $BS_{m2}$, or various sensors capable of providing information on the position of the nozzle-side test beam spot $BS_{m2}$. In particular, when the nozzle-side sensor 350 has a camera, a CCD camera may be employed as the camera. However, embodiments are not limited thereto.

The diagnosis module 50 may diagnose the optical path of the laser beam LB by analyzing the nozzle-side optical path signal output from the nozzle-side sensor 350 as described above.

As shown in FIG. 11, the diagnostic module 50 may derive a vector of the nozzle-side sensing optical path $OP_{s2}$ with respect to the position of the nozzle-side test beam spot $BS_{m2}$ sensed by the nozzle-side sensor 260, and then calculate an optical path difference $D_3$ between the nozzle-side sensing optical path $OP_{s2}$ and a predetermined second reference sensing optical path $OP_{rs2}$. In particular, the diagnostic module 50 may calculate the optical path difference $D_3$ between the nozzle-side sensing optical path $OP_{s2}$ and the second reference sensing optical path $OP_{rs2}$, using the difference between the position coordinates of the nozzle-side test beam spot $BS_{m2}$ radiated onto the nozzle-side sensing surface 350a along the nozzle-side sensing optical path $OP_{s2}$ and the position coordinates of the nozzle-side reference beam spot $BS_{r2}$ of the indicator light $LB_m$ radiated onto the nozzle-side sensing surface 350a along the second reference sensing optical path $OP_{rs2}$.

Here, the second reference sensing optical path $OP_{rs2}$ refers to a nozzle-side sensing optical path $OP_{s2}$ given when the laser beam LB is transmitted along the second reference machining optical path $OP_{rp2}$ from the nozzle-side reflective mirror 220 of the mirror mount assembly 200 located in the last step. In addition, the second reference machining optical path $OP_{rp2}$ refers to a machining optical path $OP_p$ along which the laser beam LB transmitted from the nozzle-side reflective mirror 220 of the mirror mount assembly 200 located in the last step travels when no optical path distortion occurs. As described above, the nozzle-side sensing optical path $OP_{s2}$ has the second correlation with the machining optical path $OP_p$. Accordingly, the second reference sensing optical path $OP_{rs2}$ may also be set to have the second correlation with the second reference machining optical path $OP_{rp2}$. Then, the position coordinates of the nozzle-side reference beam spot $BS_{r2}$ may function as a nozzle-side reference point in diagnosing whether the optical path distortion of the laser beam LB occurs using the position coordinates of the nozzle-side test beam spot $BS_{m2}$.

As shown in FIG. 12, when the indicator light $LB_m$ is transmitted along the machining optical path $OP_p$ coinciding with the second reference machining optical path $OP_{rp2}$, the nozzle-side sensing optical path $OP_{s2}$ coincides with the second reference sensing optical path $OP_{rs2}$. In addition, as shown in FIG. 13, when the indicator light LB is transmitted to the nozzle-side reflective mirror 320 along the machining optical path $OP_p$ deviated by a predetermined optical path difference $D_4$ from the second reference machining optical path $OP_{rp2}$, the nozzle-side sensing optical path $OP_{s2}$ and the second reference sensing optical path $OP_{rs2}$ differs from each other as much as the optical path difference $D_3$, which is proportional to the optical path difference $D_4$ between the machining optical path $OP_p$ and the second reference machining optical path $OP_{rp2}$.

The diagnostic module 50 may derive the vector of the machining optical path $OP_p$ by analyzing the vector of the nozzle-side sensing optical path $OP_{s2}$ based on the first correlation relationship. The vector of the machining optical path $OP_p$ derived as described above may include the position coordinates of the machining optical path $OP_p$, an extension direction of the machining optical path $OP_p$, and various kinds of other data about the machining optical path $OP_p$. Accordingly, the diagnostic module 50 may calculate the optical path difference $D_4$ between the machining optical path $OP_p$ and the second reference machining optical path $OP_{rp2}$ based on the optical path difference $D_3$ between the nozzle-side sensing optical path $OP_{s2}$ and the second reference sensing optical path $OP_{rs2}$. The optical path difference $D_4$ calculated as described above may correspond to the value of the vector representing the magnitude and direction of the optical path distortion occurring in the process of transmitting the laser beam LB along the machining optical path $OP_p$ leading up to the laser nozzle assembly 30.

The diagnostic module 50 may determine whether the indicator light $LB_m$ is transmitted to the nozzle-side reflective mirror 320 along the second reference machining optical path $OP_{rp2}$, based on the vector and optical path difference $D_4$ of the machining optical path $OP_p$ derived using the nozzle-side sensor 350. The machining light $LB_p$ is transmitted along the machining optical path $OP_p$ and is radiated onto the object P to be processed in the same manner as the indicator light $LB_m$. Accordingly, when it is determined that the indicator light $LB_m$ is transmitted to the nozzle-side reflective mirror 320 along the second reference machining optical path $OP_{rp2}$, the diagnostic module 50 may determine that the machining light $LB_p$ is radiated to a predetermined machining point on the object P to be processed without error. On the other hand, when it is determined that the indicator light $LB_m$ is transmitted to the nozzle-side reflective mirror 320 along the machining optical path $OP_p$ differing from the second reference machining optical path $OP_{rp2}$ by the predetermined optical path difference $D_4$, the diagnostic module 50 may determine that the machining light $LB_p$ is radiated to a position spaced apart from a predetermined reference point of the object P by the predetermined optical path difference $D_4$.

As described above, the laser beam LB generated by the laser oscillator 10 is sequentially reflected by the mount-side reflective mirrors 220 of the mirror mount assemblies 200 to be transmitted to the nozzle-side reflective mirror 320 along the machining optical path $OP_p$. Accordingly, when the machining optical path $OP_p$ and the second reference machining optical path $OP_{rp2}$ do not coincide with each other, the diagnostic module 50 may diagnostically determine that distortion of the machining optical path $OP_p$ is occurring due to abnormality during transmission of the laser beam LB to the laser nozzle assembly 300. It may be diagnosed that distortion of the optical path $OP_p$ occurs. The abnormality refers to poor alignment of the mount-side reflective mirror 220 of the mirror mount assembly 200 located in the last step, and other effects causing distortion of the machining optical path $OP_p$ during transmission of the laser beam LB to the laser nozzle assembly 300.

When the optical path difference $D_4$ between the machining optical path $OP_p$ and the second reference machining optical path $OP_{rp2}$ exceeds a predetermined reference optical path difference, the diagnostic module 50 may diagnose discrepancy between the machining optical path $OP_p$ and the second reference machining optical path $OP_{rp2}$. It is difficult to physically completely eliminate distortion of the machining optical path $OP_p$ due to tolerances in the manufacturing process and errors in the assembly process. Accordingly, only when the optical path difference $D_4$ between the machining optical path $OP_p$ and the second reference machining optical path $OP_{rp2}$ is as large as to adversely affect the machining quality of the object P due to the distortion of the machining optical path $OP_p$, discrepancy between the machining optical path $OP_p$ and the second reference machining optical path $OP_{rp2}$ is diagnosed.

FIGS. 14 to 17 are diagrams illustrating a method of collecting optical path control data of the aligner.

As described above, the optical path of the laser beam LB including the machining optical path $OP_p$, the mount-side sensing optical path $OP_{s1}$, and the nozzle-side sensing optical path $OP_{s2}$ may be adjusted by changing the alignment of the mirror plate 212 and the mount-side reflective mirror 220 mounted on the mirror plate 212 by rotating the dial 232 of the aligner 230 provided to each of the mirror mount assemblies 200 using the drive motor 234.

In addition, the direction in which the optical path of the laser beam LB is adjusted by the dial 232 (hereinafter referred to as an "optical path adjustment direction") is determined according to the rotation direction of the drive motor 234, and the amount of displacement by which the optical path of the laser beam LB is adjusted (hereinafter referred to as "optical path displacement amount") is determined according to the rotation angle of the drive motor 234.

In general, a motor has a predetermined resolution. Accordingly, the drive motors 234 provided in the laser apparatus 1 may each have a minimum rotation angle corresponding to the resolution of the drive motors 234. Thus, when a drive motor 234 linked to the dial 232 is rotated by the minimum rotation angle, the dial 232 may be rotated by an angle corresponding to the minimum rotation angle of the drive motor 234. Thereby, when the drive motor 234 linked to the dial 232 is rotated by the minimum rotation angle, each of the dials 232 provided in the laser apparatus 1 may adjust the optical path of the laser beam LB by the minimum unit optical path displacement amount proportional to the minimum rotation angle of the drive motors 234.

Due to the general characteristics of motors, a predetermined error may occur between a target rotational pattern of the motor according to the design value of the motor and the actual rotational pattern according to the current state of the motor depending on the inertia acting during driving of the motor, the wear of the motor, and the current state of the motor. Accordingly, due to the current state of the drive motor 234, an error may occur between the target minimum rotation angle according to the design value of the drive motor 234 and the actual minimum rotation angle according to the current state of the drive motor 234. Accordingly, optical path adjustment errors ($\Delta X$, $\Delta Y$) may occur between the target unit optical path displacement amount ($X_t$, $Y_t$) according to the design value of the drive motor 234 and the actual unit optical path displacement amount ($X_a$, $Y_a$) according to the current state. Here, the target unit optical path displacement amount ($X_t$, $Y_t$) of the dial 232 refers to the unit optical path displacement amount of the dial 232 given when the drive motor 234 is virtually rotated by the target minimum rotation angle according to a design value. The actual unit optical path displacement amount ($X_a$, $Y_a$) of the dial 232 refer to the unit optical path displacement amount of the dial 234 given when the dial 232 is actually rotationally driven by the actual minimum rotation angle according to the current state of the drive motor 234.

The above-described current state differs among the drive motors 234 provided in the laser apparatus 1. Accordingly, the optical path adjustment error ($\Delta X$, $\Delta Y$) between the target unit optical path displacement amount ($X_t$, $Y_t$) and the actual unit optical path displacement amount ($X_a$, $Y_a$) may differ among the aligners 230.

In addition, the influence of the current state of the drive motor 234 on the driving state of the drive motor 234 varies according to the rotation speed of the drive motor 234. Accordingly, the optical path adjustment error ($\Delta X$, $\Delta Y$) between the target unit optical path displacement amount ($X_t$, $Y_t$) and the actual unit optical path displacement amount ($X_a$, $Y_a$) may vary according to the rotation speed of the drive motor 234.

Considering the effect of the above-described characteristics of the drive motor 234 on the amount of optical path displacement, in order to correct the optical path distortion of the laser beam LB diagnosed by the diagnostic module 50, each of the aligners 230 may individually collect the actual unit optical path displacement amount ($X_a$, $Y_a$). To this end, the laser apparatus 1 may further include a data collection module 60 configured to collect and calculate optical path adjustment data of the aligner 230, and a database 70 configured to store the optical path adjustment data collected by the data collection module 60 and other overall data about driving of the laser apparatus 1. In particular, the drive motor 234 of the aligner 230 is intermittently rotated by a predetermined minimum rotation angle to rotationally drive the dial 232, the data collection module 60 may collect the optical path adjustment data by tracking a pattern in which the optical path of the beam LB is intermittently adjusted by the dial 232 by a unit optical path displacement amount proportional to the minimum rotation angle of the drive motor 234. Here, the optical path adjustment data may include the actual unit optical path displacement amount ($X_a$, $Y_a$) and a variety of data indicating a pattern of selective adjustment of the optical path of the laser beam LB by the mount-side reflective mirror 220 linked with the aligner 230 according to the driving mode of the aligner 230.

Hereinafter, a method of individually collecting optical path adjustment data by each of the aligners 230 will be described with reference to the drawings.

First, with respect to each of the mirror mount assemblies 200, the mount-side reflective mirror 220 is aligned to be set in a normal state in which optical path distortion does not occur, using the aligner 230.

It is difficult to physically completely eliminate optical path distortion due to tolerances in the manufacturing process and errors in the assembly process. Accordingly, the normal state of the mount-side reflective mirror 220 may be defined as a state in which the mount-side reflective mirror 220 is aligned as to allow for only a limited degree of optical path distortion that does not adversely affect the machining quality of the object P. In consideration of this, the operation of aligning the mount-side reflective mirror 220 to be set in the normal state may be performed by an operator by observing the sensing surfaces 260a and 350a and manually rotating the dial 232 to move the test beam spots $BS_{m1}$ and $BS_{m2}$ to positions where the distances from the reference beam spots $BS_{r1}$ and $BS_{r2}$ are less than or equal to a predetermined reference distance while the laser oscillator 10 is driven to generate the indicator light $LB_m$. For example, the operation of aligning the mount-side reflective mirror 220 located in a specific step of the reference transmission steps S to be set in the normal state may be performed by the operator by observing the mount-side sensing surface 260a of the mirror mount assembly 200 located in the step immediately after the specific step or the nozzle-side sensing surface 350a of the laser nozzle assembly 30 (when the specific step is the last step) and manually rotating the dial 232 located in the specific step to move the test beam spots $BS_{m1}$ and $BS_{m2}$ to positions where the distances from the reference beam spots $BS_{r1}$ and $BS_{r2}$ are less than or equal to a predetermined reference distance.

In addition, the operation of aligning the mount-side reflective mirror 220 to be set in the normal state may be sequentially performed according to the reference transmission steps S. For example, when five mirror mount assemblies 200 are installed, the mount-side reflective mirrors 220 may be aligned to be set in the normal state in order of a first step, a second step, a third step, a fourth step, and a fifth step.

Thereafter, the actual unit optical path displacement amount $(X_a, Y_a)$ for the aligner 230 of each of the mirror mount assemblies 200 is collected in the reverse order of the reference transmission steps S. For example, when five mirror mount assemblies 200 are installed, the actual unit optical path displacement amount $(X_a, Y_a)$ for the aligner 230 of each of the mirror mount assemblies 200 may collected in order of the fifth step, the fourth step, the third step, the second step, and the first step.

To this end, the operation of collecting the actual unit optical path displacement amount $(X_a, Y_a)$ is performed, starting with the aligner 230 of the mirror mount assembly 200 located in the last step. The operation of collecting the actual unit optical path displacement amount $(X_a, Y_a)$ for the aligner 230 of the mirror mount assembly 200 located in the last step is performed by driving the laser oscillator 10 to generate the indicator light $LB_m$ using the controller 40, while the mount-side reflective mirror 220 of the mirror mount assemblies 200 located in the steps preceding the last step and the nozzle-side reflective mirror 320 of the laser nozzle assembly 30 are respectively inserted into the optical path $OP_p$. Then, the indicator light $LB_m$ generated from the laser oscillator 10 may be guided from the laser nozzle 310 to the nozzle-side sensing optical path $OP_{s2}$ and radiated onto the nozzle-side sensing surface 350a of the nozzle-side sensor 350.

Each mirror mount assembly 200 includes a first aligner 230a configured to move the optical path of the laser beam LB in the X-axis direction, and a second aligner 230b configured to move the optical path of the laser beam LB in the Y-axis direction. Accordingly, the actual unit optical path displacement amount $X_a$ in the X-axis direction and the actual unit optical path displacement amount $Y_a$ in the Y-axis direction may be separately collected.

Figure 14:
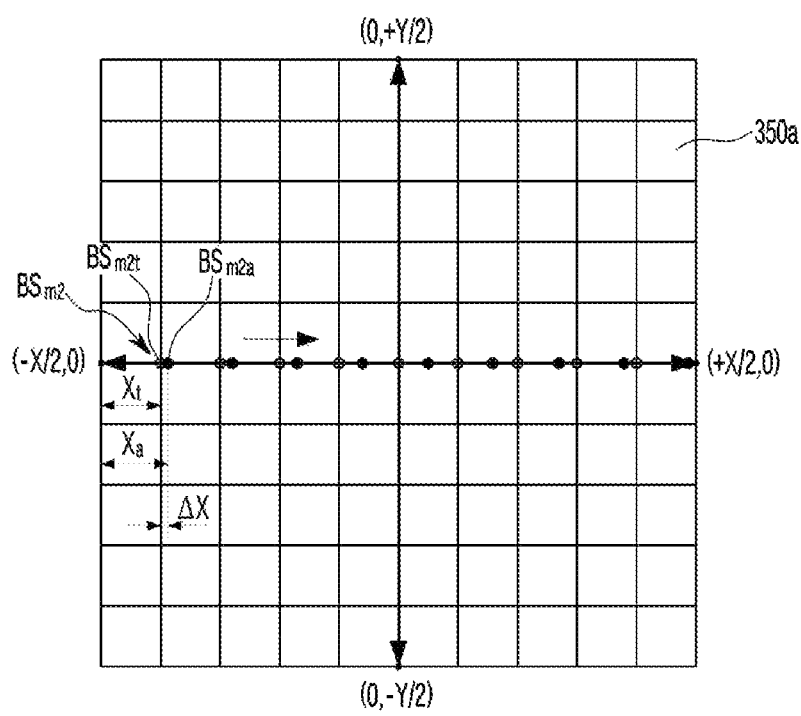
FIGS. 14 to 17 are diagrams illustrating a method of collecting optical path control data of the aligner.

A method of collecting the optical path adjustment data of the first aligner 230a is not particularly limited. For example, as shown in FIG. 14, when the nozzle-side sensing surface 350a of the nozzle-side sensor 350 is arranged such that the X-axis light-receiving length is $-X/2$ to $+X/2$, the controller 40 intermittently rotates the first dial 232a using the first drive motor 234a such that the nozzle-side test beam spot $BS_{m2}$ intermittently moves from the coordinates $(-X/2, 0)$ toward the coordinates $(+X/2, 0)$ by a target unit optical path displacement amount $X_t$. That is, the controller 40 rotates the first dial 232a in one direction such that the nozzle-side test beam spot $BS_{m2}$ is located at the coordinates $(-X/2, 0)$. Then, the controller 40 intermittently rotates the first dial 232a in the other direction opposite to the one direction using the first drive motor 234a such that the nozzle-side test beam spot $BS_{m2}$ intermittently moves toward the coordinates $(+X/2, 0)$ by the target unit optical path displacement amount $X_t$.

When the first dial 232a is driven using the first drive motor 234a in this way, the nozzle-side test beam spot $BS_{m2}$ intermittently moves toward the coordinates $(+X/2, 0)$ by the actual unit optical path displacement amount $X_a$ according to the current state of the first drive motor 234a, as shown in FIG. 14. Thereby, the data collection module 60 may analyze the nozzle-side optical path signal output from the nozzle-side sensor 350, and collect the actual unit optical path displacement amount $X_a$, movement coordinates and movement vectors, and the like of the nozzle-side test beam spot $BS_{m2}$ with respect to the first aligner 230a. In addition, the data collection module 60 may calculate the optical path adjustment error $\Delta X$ between the target unit optical path displacement amount $X_t$ and the actual unit optical path displacement amount $X_a$ by subtracting the actual unit optical path displacement amount $X_a$ from the target unit optical path displacement amount $X_t$. For example, as shown in FIG. 14, the data collection module 60 may calculate the optical path adjustment error $\Delta X$ by measuring the distance between a virtual position of the nozzle-side test beam spot $BS_{m2t}$ virtually shifted by the target unit optical path displacement amount $X_t$ according to the design value of the first drive motor 234a and the actual position of the nozzle-side test beam spot $BS_{m2a}$ actually shifted by the actual unit optical path displacement $X_a$ according to the current state of the first drive motor 234a.

The data collection module 60 stored, in the database 70, optical path adjustment data of the first aligner 230a such as the actual unit optical path displacement amount $X_a$, movement coordinates and movement vectors of the nozzle-side test beam spot $BS_{m2}$ and the optical path adjustment error $\Delta X$ between the target unit optical path displacement amount $X_t$ and the actual unit optical path displacement amount $X_a$ collected and calculated as above.

In addition, the data collection module 60 may individually collect and calculate the optical path adjustment data of the first aligner 230a for each of predetermined reference rotation speeds of the first drive motor 234a, and then store the same in the database 70. The reference rotation speeds of the first drive motor 234a may be determined according to environmental conditions such as the area of the nozzle-side sensing surface 350a and the resolution of the first drive motor 234a. However, embodiments are not limited thereto.

In addition, when the collection of the optical path adjustment data of the first aligner 230a is completed, the operator manually or automatically drives the first dial 232a to re-align the mount-side reflective mirror 220 in the normal state.

Figure 15:
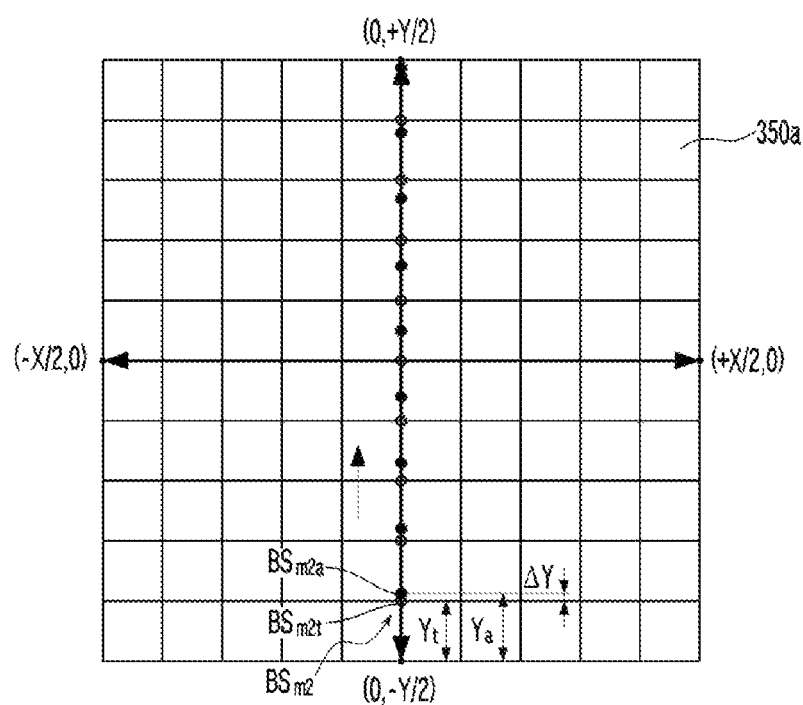

A method of collecting the optical path adjustment data of the second aligner 230b is not particularly limited. For example, as shown in FIG. 15, when the nozzle-side sensing surface 350a of the nozzle-side sensor 350 is arranged such that the Y-axis light-receiving length is −Y/2 to +Y/2, the controller 40 intermittently rotates the second dial 232b using the second drive motor 234a such that the nozzle-side test beam spot $BS_{m2}$ intermittently moves from the coordinates (0, −Y/2) toward the coordinates (0, +Y/2) by a target unit optical path displacement amount $Y_t$. That is, the controller 40 rotates the second dial 232b in one direction such that the nozzle-side test beam spot $BS_{m2}$ is located at the coordinates (0, −Y/2). Then, the controller 40 intermittently rotates the second dial 232b in the other direction opposite to the one direction using the second drive motor 234a such that the nozzle-side test beam spot $BS_{m2}$ intermittently moves toward the coordinates (0, +Y/2) by the target unit optical path displacement amount $Y_t$.

While the second aligner 230b is driven, the data collection module 60 may analyze the nozzle-side optical path signal output from the nozzle-side sensor 350, and collect and calculate the optical path adjustment data of the second aligner 230b such as the actual unit optical path displacement amount $Y_a$, movement coordinates and movement vectors of the nozzle-side test beam spot $BS_{m2}$, the optical path adjustment error $\Delta Y$ between the target unit optical path displacement amount $Y_t$ and the actual unit optical path displacement amount $Y_a$, and then store the same in the database 70. For example, as shown in FIG. 15, the data collection module 60 may calculate the optical path adjustment error $\Delta Y$ by measuring the distance between a virtual position of the nozzle-side test beam spot $BS_{m2t}$ virtually shifted by the target unit optical path displacement amount $Y_t$ according to the design value of the second drive motor 234b and the actual position of the nozzle-side test beam spot $BS_{m2a}$ actually shifted by the actual unit optical path displacement $Y_a$ according to the current state of the second drive motor 234b.

The optical path adjustment data of the second aligner 230b may be individually collected and calculated for each of the reference speeds of the second drive motor 234b. The reference rotation speeds of the second drive motor 234b may be determined according to environmental conditions such as the area of the nozzle-side sensing surface 350a and the resolution of the second drive motor 234b. However, embodiments are not limited thereto. The method of collecting and calculating the optical path adjustment data of the second aligner 230b is the same as that for the first aligner 230a, and thus a further detailed description thereof will be omitted.

In addition, when the collection of the optical path adjustment data of the second aligner 230b is completed, the operator manually or automatically drives the second dial 232b to re-align the mount-side reflective mirror 220 in the normal state.

While it has been described that the optical path adjustment data collection and calculation operation of the first aligner 230a and the optical path adjustment data collection and calculation operation of the second aligner 230b are performed separately, embodiments are not limited thereto. The optical path adjustment data collection and calculation operation of the first aligner 230a and the optical path adjustment data collection and calculation operation of the second aligner 230b may be performed simultaneously by driving the first drive motor 234a and the second drive motor 234b simultaneously.

After the optical path adjustment data of the aligner 230 of the mirror mount assembly 200 located in the last step is collected as described above, the optical path adjustment data of the aligner 230 of the mirror mount assembly 200 located in the step immediately before the last step is collected.

For example, when five mirror mount assemblies 200 are installed, the actual unit optical path displacement amount $(X_a, Y_a)$ for the aligner 230 of the mirror mount assembly 200 located in the fourth step is collected. In this case, the operation of collecting the actual unit optical path displacement amount $(X_a, Y_a)$ for the aligner 230 of the mirror mount assembly 200 located in the fourth step is performed by driving the laser oscillator 10 using the controller 40 to generate the indicator light $LB_m$, while withdrawing the mount-side reflective mirror 220 of the mirror mount assembly 200 located in the fifth step from the machining optical path $OP_p$, and inserting the mount-side reflective mirrors 220 of the other mirror mount assemblies 200 into the machining optical path $OP_p$. Then, the indicator light $LB_m$ generated from the laser oscillator 10 may be guided from the mirror mount assembly 200 located in the fifth step to the mount-side sensing optical path $OP_{s1}$, and radiated onto the mount-side sensing surface 260a of the mount-side sensor 260.

The operation of collecting the actual unit optical path displacement amount $(X_a, Y_a)$ for the aligner 230 of the mirror mount assembly 200 located in the fourth step may also be performed in the same manner as the operation of collecting the actual unit optical path displacement amount $(X_a, Y_a)$ for the aligner 230 of the mirror mount assembly 200 located in the fifth step.

Figure 16:
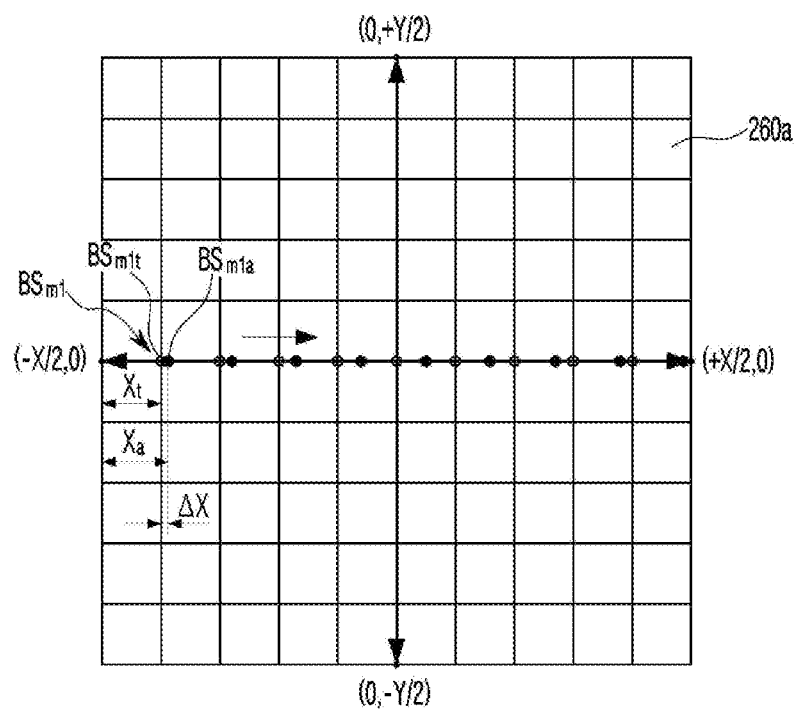

For example, as shown in FIG. 16, when the nozzle-side sensing surface 260a of the mount-side sensor 260 is arranged such that the X-axis light-receiving length is −X/2 to +X/2, the controller 40 intermittently rotates the first dial 232a using the first drive motor 234a such that the mount-side test beam spot $BS_{m1}$ intermittently moves from the coordinates (−X/2, 0) toward the coordinates (+X/2, 0) by a target unit optical path displacement amount $X_t$. That is, the controller 40 rotates the first dial 232a in one direction such that the mount-side test beam spot $BS_{m1}$ is located at the coordinates (−X/2, 0). Then, the controller 40 intermittently rotates the first dial 232a in the other direction opposite to the one direction using the first drive motor 234a such that the mount-side test beam spot $BS_{m1}$ intermittently moves toward the coordinates (+X/2, 0) by the target unit optical path displacement amount $X_t$. Here, the mount-side sensor 260 represents the mount-side sensor 260 of the mirror mount assembly 200 located in the step after the fourth step, that is, the fifth step.

While the first aligner 230a is driven, the data collection module 60 may analyze the mount-side optical path signal output from the mount-side sensor 260, and collect and calculate the optical path adjustment data of the first aligner 230a such as the actual unit optical path displacement amount $X_a$, movement coordinates and movement vectors of the mount-side test beam spot $BS_{m1}$, the optical path adjustment error $\Delta X$ between the target unit optical path displacement amount $X_t$ and the actual unit optical path displacement amount $X_a$, and then store the same in the database 70. For example, as shown in FIG. 16, the data collection module 60 may calculate the optical path adjustment error ΔX by measuring the distance between a virtual position of the mount-side test beam spot $BS_{m1t}$ virtually shifted by the target unit optical path displacement amount $X_t$ according to the design value of the first drive motor 234$a$ and the actual position of the mount-side test beam spot $BS_{m1a}$ actually shifted by the actual unit optical path displacement $X_a$ according to the current state of the first drive motor 234$a$. The optical path adjustment data of the first aligner 230$a$ may be individually collected and calculated for each of the reference speeds of the first drive motor 234$a$.

Figure 17:
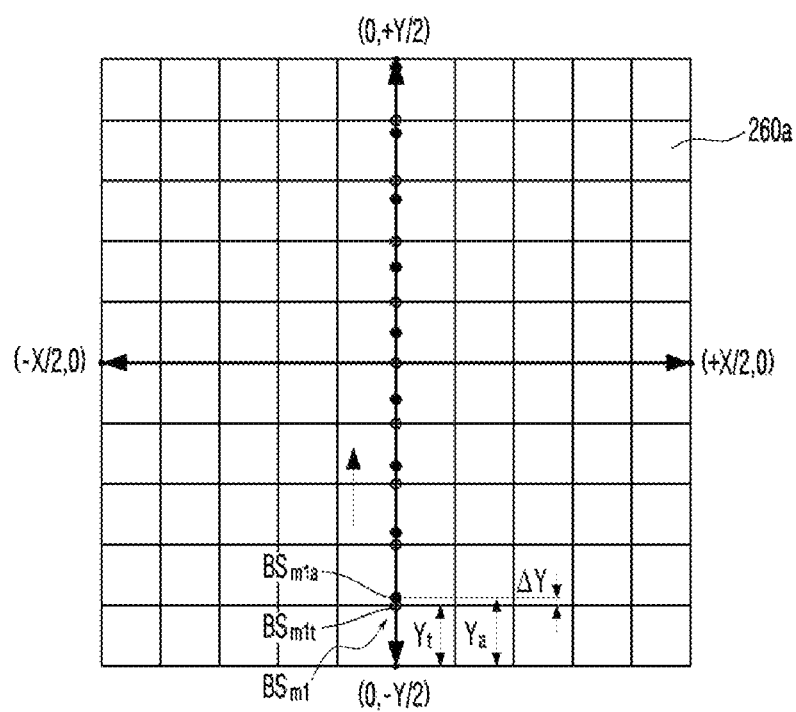

The method of collecting the optical path adjustment data of the second aligner 230$b$ is not particularly limited. For example, as shown in FIG. 17, when the mount-side sensing surface 260$a$ is arranged such that the Y-axis light-receiving length is −Y/2 to +Y/2, the controller 40 intermittently rotates the second dial 232$b$ using the second drive motor 234$a$ such that a first test beam spot intermittently moves from the coordinates (0, −Y/2) toward the coordinates (0, +Y/2) by a target unit optical path displacement amount $Y_t$. That is, the controller 40 rotates the second dial 232$b$ in one direction such that the mount-side test beam spot $BS_{m1}$ is located at the coordinates (0, −Y/2). Then, the controller 40 intermittently rotates the second dial 232$b$ in the other direction opposite to the one direction using the second drive motor 234$a$ such that the nozzle-side test beam spot $BS_{m2}$ intermittently moves toward the coordinates (0, +Y/2) by the target unit optical path displacement amount $Y_t$. Here, the mount-side sensor 260 represents the mount-side sensor 260 of the mirror mount assembly 200 located in the step after the fourth step, that is, the fifth step.

While the second aligner 230$b$ is driven, the data collection module 60 may analyze the mount-side optical path signal output from the mount-side sensor 260, and collect and calculate the optical path adjustment data of the second aligner 230$b$ such as the actual unit optical path displacement amount $Y_a$, movement coordinates and movement vectors of the mount-side test beam spot $BS_{m1}$, the optical path adjustment error ΔY between the target unit optical path displacement amount $Y_t$ and the actual unit optical path displacement amount $Y_a$, and then store the same in the database 70. For example, as shown in FIG. 17, the data collection module 60 may calculate the optical path adjustment error ΔY by measuring the distance between a virtual position of the mount-side test beam spot $BS_{m1t}$ virtually shifted by the target unit optical path displacement amount $Y_t$ according to the design value of the second drive motor 234$b$ and the actual position of the mount-side test beam spot $BS_{m1a}$ actually shifted by the actual unit optical path displacement $Y_a$ according to the current state of the second drive motor 234$b$. The optical path adjustment data of the second aligner 230$b$ may be individually collected and calculated for each of the reference speeds of the second drive motor 234$b$.

After the optical path adjustment data of the aligner 230 is collected as above, data such as the actual unit optical path displacement amount ($X_a$, $Y_a$), movement coordinates and movement vectors of the nozzle-side test beam spot $BS_{m2}$, and the optical path adjustment error (ΔX, ΔY) between the target unit optical path displacement amount ($X_t$, $Y_t$) and the actual unit optical path displacement amount ($X_a$, $Y_a$) according to the driving of the aligner 230 of the mirror mount assembly 200 located in the fourth step may be additionally collected using the final sensor, that is, the nozzle-side sensor 350. This is intended to collect the final sensor data, which indicates how the position to which the laser beam LB is radiated on the object P is changed due to the optical path adjustment errors (ΔX, ΔY) generated in adjusting the optical path of the laser beam LB using the aligner 230, because the optical path adjustment errors (ΔX, ΔY) generated in adjusting the optical path of the laser beam LB using the aligner 230 tend to increase as the operation proceeds to the later steps of the reference transmission steps S. When the drive motor 234 of the aligner 230 provided in one of the mirror mount assemblies 200 except the mirror mount assembly 200 located in the last step is intermittently rotated by the actual rotation angle, the final collected data may include information on a pattern in which the position on the object P to which the laser beam LB emitted from the laser nozzle 310 is radiated is selectively adjusted by the aligner 230 provided in the one mirror mount assembly 200.

In addition, the collection of the final sensor data is performed while the laser oscillator 10 is driven to generate the indicator light $LB_m$ using the controller 40, and the entire mount-side reflective mirrors 220 and the nozzle-side reflective mirror 320 provided in the laser apparatus 1 are respectively inserted into the machining optical path $OP_p$. Then, while the indicator light $LB_m$ generated from the laser oscillator 10 is radiated onto the nozzle-side sensing surface 350$a$, the data collection module 60 may analyze the nozzle-side optical path signal output from the nozzle-side sensor 350, collect and calculate the final sensor data, and then store the data in the database 70. The final sensor data may be individually collected for each of the reference rotation speeds of the drive motor 234, as in the case of the optical path adjustment data. This method of collecting and calculating the final sensor data is the same as the method of collecting and calculating optical path adjustment data of the aligner 230 described above, except that the movement pattern of the nozzle-side test beam spot $BS_{m2}$ is observed using the final sensor. Accordingly, a detailed description thereof will be omitted.

As described above, when collection of the optical path adjustment data and the final sensor data of the aligner 230 of the mirror mount assembly 200 located in the fourth step is completed, the data collection module 60 analyzes the mount-side optical path signal and the nozzle-side optical path signal, and individually collects the optical path adjustment data and final sensor data of the aligner 230 of each of the mirror mount assemblies 200 in order of the third step, the second step, and the first step. Even in this case, the optical path adjustment data and the final sensor data may be individually collected for each of the reference rotation speeds of the drive motor 234.

The operation of aligning the mount-side reflective mirror 220 of each of the above-described mirror mount assemblies 200 in the normal state (hereinafter referred to as "an operation of aligning the mount-side reflective mirror 200 in the normal state"), and the operation of collecting the optical path adjustment data and final sensor data of the aligner 230 of each of the mirror mount assemblies 200 (hereinafter referred to as "an operation of collecting optical path adjustment data and the like") may be performed repeatedly. This operation is performed in consideration that due to environmental conditions such as wear, aging, and assembly tolerances of the drive motor 234 and other components, the optical path adjustment data and the final sensor data may change irregularly over time.

The operation of aligning the above-described mount-side reflective mirror 220 in the normal state and the operation of collecting light path adjustment data and the like may be repeatedly performed whenever predetermined collection conditions are satisfied. For example, the operation of aligning the above-described mount-side reflective mirror 220 in the normal state and the operation of collecting light path adjustment data and the like may be repeatedly performed when a predetermined reference time elapses after the previous operation of collecting optical path adjustment data and the like Alternatively, it may be repeatedly performed or whenever the installation environment of the laser apparatus 1 is changed, as in the case where replacement, realignment, and reassembly of the drive motor 234 and other components occur.

As the optical path adjustment data and the final sensor data are repeatedly collected as described above, the data collection module 60 may build big data by accumulating the optical path adjustment data and the final sensor data that are repeatedly collected over time. In other words, the data collection module 60 repeatedly collects optical path adjustment data and final sensor data over time, and updates the big data.

The big data may further include various types of data that may be used for correction of optical path distortion in addition to the optical path adjustment data and final sensor data. Such big data may be stored in the database 70. However, embodiments are not limited thereto.

Figure 18:
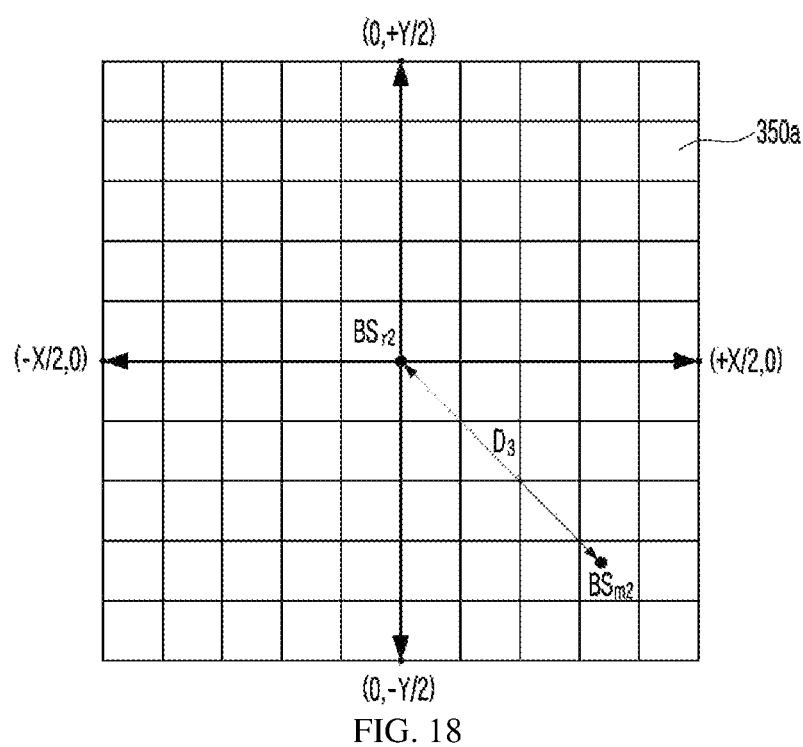
FIGS. 18 and 19 illustrate a method of correcting distortion of the optical path of a laser beam using an aligner.
Figure 19:
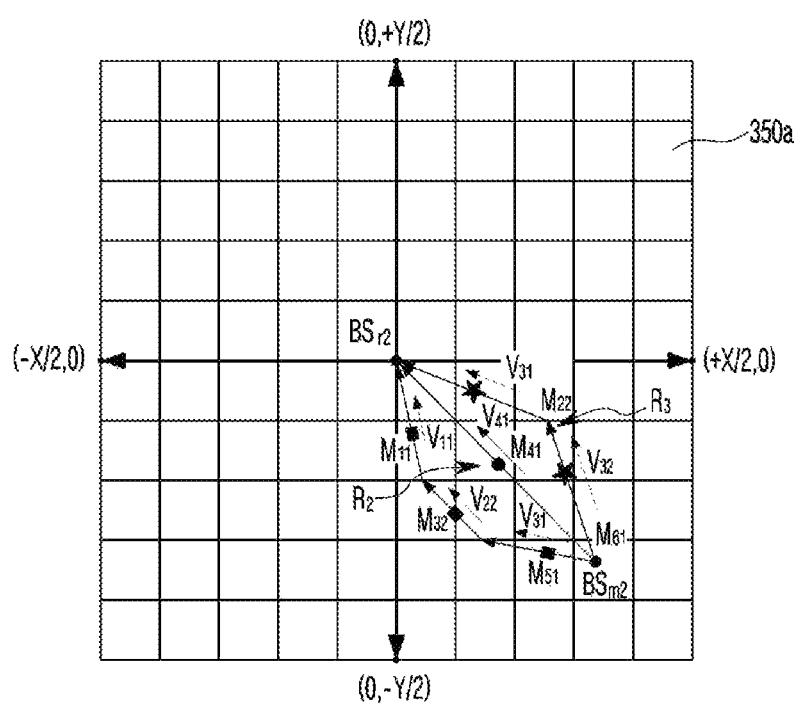

FIGS. 18 and 19 illustrate a method of correcting distortion of the optical path of a laser beam using an aligner.

When the laser apparatus 1 is used for a long time, the mount-side reflective mirror 220, the aligned state of the mount-side reflective mirror 220 may be arbitrarily changed from set values due to wear, aging and assembly tolerances of the mount-side reflective mirror 220, the drive motor 234, and other components, vibrations applied from the outside, and other external forces. Thereby, distortion of the optical path of the laser beam LB may occur. The optical path distortion of the laser beam P degrades the quality of the object P. Accordingly, the laser apparatus 1 may selectively drive the aligners 230 based on the big data stored in the database 70 to correct the optical path distortion of the laser beam LB.

Hereinafter, a method of correcting optical path distortion of the laser beam LB using the big data stored in the database 70 will be described.

First, whenever a predetermined condition for diagnosis is satisfied, it is diagnostically determined whether the optical path distortion of the laser beam LB has occurred. The condition for diagnosis is not particularly limited. For example, when a predetermined reference time elapses after the previous diagnosis of optical path distortion, the laser machining operation of the object P is terminated, or the laser apparatus 10 is started (power ON), it may be diagnosed whether the optical path distortion of the laser beam LB has occurred.

The method of diagnosing whether optical path distortion has occurred is not particularly limited. For example, the operation of diagnosing whether optical path distortion has occurred may be performed while the laser oscillator 10 is driven to generate the indicator light $LB_m$ using the controller 40, and the entire mount-side reflective mirrors 220 and the nozzle-side reflective mirror 320 provided in the laser apparatus 1 are respectively inserted into the machining optical path $OP_p$ such that the indicator light $LB_m$ is radiated onto the nozzle-side sensing surface 350a of the final sensor, that is, the nozzle-side sensor 350. Then, as shown in FIG. 18, the diagnostic module 50 may diagnose weather distortion has occurred in the optical path of the laser beam LB based on the distance between the nozzle-side test beam spot $BS_{m2}$ on the nozzle-side sensing surface 350a and the nozzle-side reference beam spot $BS_{r2}$, which is measured by analyzing the nozzle-side optical path signal output from the nozzle-side sensor 350. For example, when the distance between the nozzle-side test beam spot $BS_{m2}$ and the nozzle-side reference beam spot $BS_{r2}$ exceeds a predetermined reference distance, the diagnostic module 50 may perform the nozzle-side sensing optical path $OP_{s2}$ may diagnose that distortion has occurred in the optical path of the laser beam LB, that is, the machining optical path $OP_p$, by an optical path difference proportional to the optical path difference $D_3$ between the nozzle-side sensing optical path $OP_{s2}$ and the second reference sensing optical path $OP_{rs2}$. When the distance between the nozzle-side test beam spot $BS_{m2}$ and the nozzle-side reference beam spot $BS_{r2}$ is less than or equal to the predetermined reference distance, the diagnostic module 50 may diagnose that distortion has not occurred in the optical path of the laser beam LB.

Thereafter, according to the pattern of distortion in the optical path of the laser beam LB, at least one aligner 230 among all aligners 230 provided in the laser apparatus 1 may be selectively driven according to a driving method corresponding to the pattern of distortion in the optical path of the laser beam LB to move the nozzle-side test beam spot $BS_{m2}$ to a position where the distance from the nozzle-side reference beam spot $BS_{R2}$ is less than or equal to the predetermined reference distance. Thereby, the optical path distortion may be corrected.

Referring to FIG. 19, through various movement routes, the nozzle-side test beam spot $BS_{m2}$ may be moved to a position where the distance from the nozzle-side reference beam spot $BS_{R2}$ is less than or equal to the predetermined reference distance. The number and type of aligners 230 required to move the nozzle-side test beam spot $BS_{m2}$, the rotation speed and rotation direction of the drive motor 234 provided in each aligner 230, the optical path displacement amount (i.e., the rotation angle of the drive motor 234) by each aligner 230 may differ among the movement routes. The factors shown in FIG. 19 have the following meanings.

Ra: Movement route of the nozzle-side test beam spot/a: Route identification number (Example) $R_1$: First route $M_{bc}$: Vector representing the direction of optical path adjustment and the amount of optical path displacement by the aligner/b: Position of the aligner among the reference transmission steps/c: Aligner type (1: First aligner, 2: Second aligner)

(Example) $M_{11}$: Vector representing the direction of optical path adjustment and the amount of optical path displacement according to the driving of the first aligner of the mirror mount assembly located in the first step of the reference transmission steps.

$V_{de}$: Rotation speed and direction of the drive motor/d: Rotation speed level of the drive motor/e: Rotation direction of the drive motor (1: clockwise, 2: counter-clockwise)

(Example) $V_{11}$: Driving the drive motor clockwise at the rotation speed level 1

In order to correct optical path distortion, the laser apparatus 1 may further include a data analysis module 80 configured to search and analyze big data stored in the database 70 based on the position coordinates of the nozzle-side test beam spot $BS_{m2}$, and derive correction data to make the movement vector (distance) of the nozzle-side test beam spot $BS_{m2}$ the shortest vector (distance). The data analysis module 80 searches and analyzes the big data stored in the database 70 based on the position coordinates of the nozzle-side test beam spot $BS_{m2}$, and derives a movement route (for example, $R_2$) through which the movement vector of the nozzle-side test beam spot $BS_{m2}$ becomes the shortest vector among various movement routes through which the nozzle-side test beam spot $BS_{m2}$ can be moved to a position where the distance from the nozzle-side reference beam spot $BS_{r2}$ is less than or equal to the predetermined reference distance. To this end, the data analysis module 80 may be configured to analyze the big data stored in the database 70 based on various analysis techniques and stochastic theories used for big data analysis, and derive a movement route determined to have the highest probability that the movement vector of the nozzle-side test beam spot $BS_{m2}$ become the shortest vector among various movement routes.

The correction data may include the number and type of aligners 230 required to move the nozzle-side test beam spot $BS_{m2}$ toward the nozzle-side reference beam spot $BS_{r2}$ along a movement route which is the shortest vector, the rotation direction and rotation speed of the drive motor 234 provided in each aligner 230, the amount of optical path displacement by each aligner 230 (the rotation angle of the drive motor 234), and the order of the aligners 230 to be driven.

The controller 40 individually drives the drive motor 234 of each of the at least one aligner 230 by a specific rotation speed, a specific rotation direction, and a specific rotation amount according to the correction data input from the data analysis module 80. Then, as shown in FIG. 19, the nozzle-side sensing optical path $OP_{s2}$, the machining optical path $OP_p$, and the optical path of the laser beam LB may be adjusted such that the nozzle-side test beam spot $BS_{m2}$ is moved to a position where the distance from the nozzle-side reference beam spot $BS_{r2}$ is less than or equal to a predetermined reference distance. Thereby, optical path distortion may be corrected.

The data collection module 60 stores data about the result of correction of the optical path distortion in the database 70 so as to be additionally included in the above-described big data. Thereby, the data collection module 60 may update big data while accumulating variable data such as mechanical change and aging of the drive motor 234 and other components over time. In addition, when optical path distortion of a pattern similar to the previously generated optical path distortion occurs, the data analysis module 80 may derive correction data with reference to the results of correction of optical path distortion accumulated in the big data, thereby improving the accuracy of the correction operation.

After deriving correction data by search and analysis of the big data stored in the database 70 according to an occurrence pattern of optical path distortion as described above, the laser apparatus 1 may automatically correct the optical path distortion by selectively driving at least one aligner 230 according to the correction data. Accordingly, by implementing a technology for automatic correction of the optical path distortion based on big data, the laser apparatus 1 may reduce the time required for correcting the optical path distortion and prevalent the laser machining quality of the object P from being degraded due to the optical path distortion.

Figure 20:
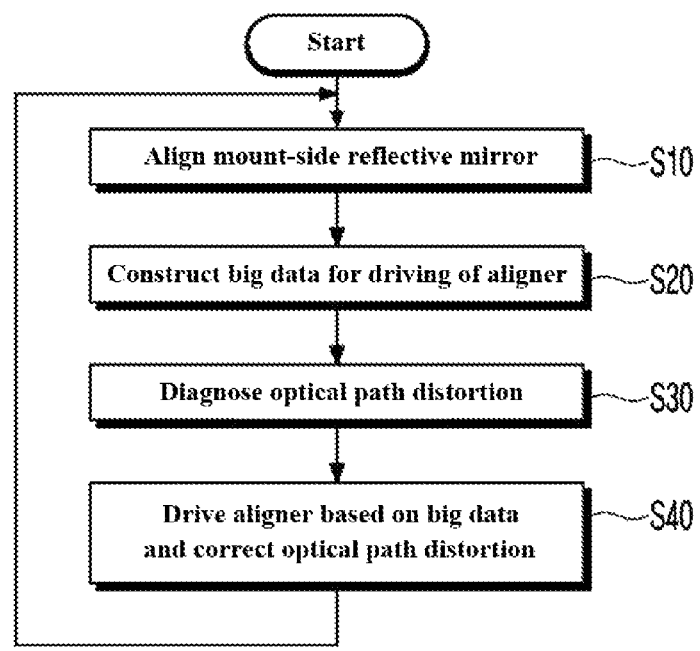
FIG. 20 illustrates a method of diagnosing and correcting distortion of the optical path of a laser beam using the laser apparatus according to an exemplary embodiment of the present disclosure.

FIG. 20 illustrates a method of diagnosing and correcting distortion of the optical path of a laser beam LB using the laser apparatus 1 according to an exemplary embodiment of the present disclosure.

Referring to FIG. 20, the method of diagnosing and correcting optical path distortion of a laser beam LB using the laser apparatus 1 includes aligning each of the mount-side reflective mirrors 220 in a predetermined normal state (S10), collecting optical path adjustment data of each of the aligners 230 and constructing big data (S20), diagnosing whether optical path distortion of the laser beam LB has occurred (S30), and driving the aligners 230 based on correction data derived from the big data and correcting the optical path distortion of the laser beam LB (S40).

In operation S10, each of the aligners 230 provided in the laser apparatus 1 is rotated to align each of the mount-side reflective mirrors 220 provided in the laser apparatus 1 in the predetermined normal state. The alignment of the mount-side reflective mirror 220 may be performed by manually rotating the dial 232 of each mirror mount assembly 200 according to the reference transmission steps S, but embodiments are not limited thereto.

In operation S20, the controller 40 rotates the dial 232 linked with the drive motor 234 using the drive motor 234 provided in each aligner 230, and the data collection module 60 collects optical path adjustment data and final sensor data of each aligner 230. The collection of the optical path adjustment data and the final sensor data may be individually performed for each of the aligners 230 provided in the mirror mount assembly 200 in reverse order of the reference transmission step S, but embodiments are not limited thereto. The data collection module 60 may store the optical path adjustment data and the final sensor data of each of the aligners 230 collected as above in in the database 70 so as to be included in the population of big data available for correction of optical path distortion with the aligners 230.

In operation S30, when a predetermined diagnosis condition is satisfied, the diagnosis module 50 may sense the position of the nozzle-side test beam spot $BS_{m2}$ on the nozzle-side sensing surface 350a provided in the nozzle-side sensor 350, and then diagnose whether optical path distortion occurs based on the distance between the nozzle-side test beam spot $BS_{m2}$ and the nozzle-side reference beam spot $BS_{r2}$. For example, when the distance between the nozzle-side test beam spot $BS_{m2}$ and the nozzle-side reference beam spot $BS_{r2}$ is less than or equal to a predetermined reference distance, the diagnostic module 50 may diagnose the normal state in which the optical path distortion has not occurred. When the distance between the nozzle-side test beam spot $BS_{m2}$ and the nozzle-side reference beam spot $BS_{r2}$ exceeds the predetermined reference distance, the diagnostic module 50 may diagnose an abnormal state in which optical path distortion has occurred.

In operation S40, the correction module 80 searches the big data constructed in operation S20 based on the position coordinates of the nozzle-side test beam spot $BS_{m2}$ sensed in operation S30, and derives correction data for correcting optical path distortion using the aligners 230. The controller 40 may automatically correct the optical path distortion by selectively driving at least one aligner 230 based on the derived correction data using a driving method according to the correction data.

As apparent from the above description, according to the present disclosure, a laser apparatus may search and analyze big data stored in a database according to an occurrence pattern of optical path distortion, derive correction data, and then selectively drive at least one aligner according to the correction data, thereby automatically correcting optical path distortion. According to the present disclosure, by implementing a technology for automatically correcting optical path distortion based on big data, the time required for correcting optical path distortion may be reduced, and degradation in quality of laser machining of an object, which is caused by optical path distortion, may be prevented.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims. The modifications should not be individually understood from the technical spirit or prospect of the present disclosure.

What is claimed is:

1. A laser apparatus comprising:
a laser oscillator configured to generate a laser beam;
a plurality of mirror mount assemblies each arranged in one of predetermined reference transmission steps, each of the mirror mount assemblies including a mount-side reflective mirror configured to reflect and transmit the laser beam, and an aligner configured to change alignment of the mount-side reflective mirror to adjust a machining optical path through which the laser beam transmitted by the mount-side reflective mirror travels;
a laser nozzle assembly including a laser nozzle configured to radiate the laser beam transmitted from the mirror mount assembly located in the last step of the reference transmission steps onto an object to be processed, and a nozzle-side sensor configured to sense the laser beam transmitted to the laser nozzle and output a nozzle-side sensing signal containing vector information about the machining optical path;
a database configured to store big data constructed to include optical path adjustment data indicating a pattern of selective adjustment of the machining optical path by the mount-side reflective mirror linked with the aligner according to a driving method of the aligner; and
a controller configured to correct, when distortion occurs in the machining optical path, the distortion of the machining optical path by selectively driving the aligner provided in each of at least one mirror mount assembly among the mirror mount assemblies based on the big data using a driving method according to a pattern of the distortion of the machining optical path,
wherein the nozzle-side sensor has a nozzle-side sensing surface arranged to allow the laser beam to be radiated thereonto, a coordinate system for specifying a position of a beam spot of the laser beam being set on the nozzle-side sensing surface,
wherein the optical path adjustment data individually collected for the aligner provided in each of the mirror mount assemblies is stored in the database,
wherein, when the distortion of the machining optical path in which a distance between the beam spot and a predetermined reference point exceeds a predetermined reference distance occurs, the controller is configured to correct the distortion of the machining optical path by selectively driving the aligner provided in each of the at least one mirror mount assembly among the mirror mount assemblies according to the driving method obtained based on the big data with respect to the position of the beam spot so as to move the beam spot to a position where the distance between the beam spot and the reference point is less than or equal to the reference distance such that the beam spot moves along a movement route in which a movement vector of the beam spot is a shortest vector, the movement route is one of movement routes of the beam spot driven by the aligner.

2. The laser apparatus of claim 1, wherein the aligner comprises:
a dial configured to change the alignment of the mount-side reflective mirror according to a rotation direction and rotation angle; and
a drive motor configured to rotate the dial,
wherein the controller is further configured to collect the optical path adjustment data and update the big data by tracking, when the dial is rotated by intermittently rotating the drive motor by a predetermined minimum rotation angle, a pattern of intermittently adjustment of the machining optical path by the dial by a unit optical path displacement amount proportional to the minimum rotation angle.

3. The laser apparatus of claim 2, wherein the controller individually collects, for the aligner provided in each of the mirror mount assemblies, an actual unit optical path displacement amount corresponding to a unit optical path displacement amount produced when the drive motor is actually rotated by an actual minimum rotation angle according to a current state of the drive motor, and updates the big data.

4. The laser apparatus of claim 3, wherein the controller individually collects the actual unit optical path displacement amount for each of predetermined reference rotation speeds of the drive motor.

5. The laser apparatus of claim 3, wherein the controller individually collects an error between a target unit optical path displacement amount and the actual unit optical path displacement amount for the aligner provided in each of the mirror mount assemblies and updates the big data, the target unit optical path displacement amount corresponding to a unit optical path displacement amount given when the drive motor is rotated by a target minimum rotation angle according to a predetermined design value of the drive motor, and updates the big data.

6. The laser apparatus of claim 3, wherein, when a predetermined collection condition is satisfied, the controller repeatedly collects the optical path adjustment data including the actual unit optical path displacement amount for the aligner provided in each of the mirror mount assemblies, and updates the big data.

7. The laser apparatus of claim 2,
wherein the controller is further configured to analyze the nozzle-side sensing signal and diagnose whether distortion has occurred in the machining optical path.

8. The laser apparatus of claim 7, wherein the laser nozzle assembly further comprises:
a nozzle-side reflective mirror configured to reflect and transmit the laser beam transmitted to the laser nozzle along the machining optical path; and
a nozzle-side transport body configured to transport the nozzle-side reflective mirror along a predetermined transport optical path in a reciprocating manner such that the nozzle-side reflective mirror is inserted into or withdrawn from the machining optical path, the nozzle-side transport body selectively guiding the laser beam to a nozzle-side sensing path having a predetermined nozzle-side correlation with the machining optical path,
wherein the nozzle-side sensor senses the laser beam guided to the nozzle-side sensing optical path and outputs the nozzle-side sensing signal containing vector information about the nozzle-side sensing optical path,
wherein the controller diagnoses whether distortion has occurred in the machining optical path by analyzing the nozzle-side sensing signal based on the nozzle-side correlation.

9. The laser apparatus of claim 7, wherein each of the mirror mount assemblies further comprises:
a mount-side sensor configured to sense the laser beam transmitted to the mirror mount assembly and output a mount-side sensing signal containing vector information about the machining optical path,
wherein the controller diagnoses whether distortion has occurred in the machining optical path by analyzing the mount-side sensing signal.

10. The laser apparatus of claim 9, wherein each of the mirror mount assemblies further comprises:
a mount-side transport body configured to transport the mount-side reflective mirror along a predetermined transport optical path in a reciprocating manner such that the mount-side reflective mirror is inserted into or withdrawn from the machining optical path, the mount-side transport body selectively guiding the laser beam to a mount-side sensing path having a predetermined mount-side correlation with the machining optical path,
wherein the mount-side sensor senses the laser beam guided to the mount-side sensing optical path and outputs the mount-side sensing signal containing vector information about the mount-side sensing optical path,
wherein the controller diagnoses whether distortion has occurred in the machining optical path by analyzing the mount-side sensing signal based on the mount-side correlation.

11. The laser apparatus of claim 9, wherein, when the drive motor of the aligner provided in one of the mirror mount assemblies except the mirror mount assembly located in the last step is intermittently rotated by the actual minimum rotation angle, the controller obtains a pattern of adjustment of the machining optical path by the mount-side reflective mirror of the one mirror mount assembly using the mount-side sensor of the mirror mount assembly located next to the one mirror mount assembly, and collects the optical path adjustment data of the aligner provided in the one mirror mount assembly.

12. The laser apparatus of claim 11, wherein, when the drive motor of the aligner provided in one of the mirror mount assemblies except the mirror mount assembly located in the last step is intermittently rotated by the actual minimum rotation angle, the controller obtains a pattern of adjustment of the optical path by the mount-side reflective mirror of the one mirror mount assembly using the nozzle-side sensor, and collects final sensor data indicating a pattern of selective adjustment of a position on the object by the aligner provided in the one mirror mount assembly, the laser beam emitted from the laser nozzle being radiated to the position.

13. The laser apparatus of claim 9, wherein, when the drive motor of the aligner provided in the mirror mount assembly located in the last step is intermittently rotated by the actual minimum rotation, the controller obtains a pattern of adjustment of the machining optical path by the mount-side reflective mirror of the mirror mount assembly located in the last step using the nozzle-side sensor, and collects the optical path adjustment data of the aligner provided in the mirror mount assembly located in the last step.

14. The laser apparatus of claim 12, wherein the controller separately collects the optical path adjustment data and the final sensor data for each of predetermined reference rotation speeds of the drive motor.

15. The laser apparatus of claim 7, wherein the controller diagnoses whether distortion has occurred in the machining optical path based on coordinates of the position of the beam spot of the laser beam radiated onto the nozzle-side sensing surface.

16. The laser apparatus of claim 15, wherein, when a distance between a predetermined nozzle-side reference point on the nozzle-side sensing surface and the beam spot exceeds a predetermined reference distance, the controller diagnoses that distortion has occurred in the machining optical path.

17. The laser apparatus of claim 16, wherein, when it is diagnosed that distortion has occurred in the machining optical path, the controller corrects the distortion of the machining optical path by selectively driving the aligner provided in each of at least one mirror mount assembly of the mirror mount assemblies in a driving manner corresponding to a pattern of distortion of the machining optical path based on the big data such that the beam spot is moved to a position where a distance from the nozzle-side reference point is less than or equal to the reference distance.

18. The laser apparatus of claim 17,
wherein the controller is further configured to:
search and analyze, when it is diagnosed that distortion has occurred in the machining optical path, the big data based on the coordinates of the position of the beam spot; and
derive correction data for correcting the distortion of the machining optical path selectively using the aligner provided in at least one of the mirror mount assemblies,
wherein the controller drives the aligner provided in each of the at least one mirror mount assembly selected from the mirror mount assemblies according to the correction data so as to correct the distortion of the machining optical path.

19. The laser apparatus of claim 18, wherein the controller stores a result of correcting the distortion of the machining optical path in the database to update the big data.

20. The laser apparatus of claim 18, wherein the controller derives the correction data so as to include data about a type and number of aligners used to correct the distortion of the machining optical path among all the aligners provided in the mirror mount assemblies, and a rotation direction, a rotation angle, and a rotation speed of the drive motor provided in each of the aligners used to correct the distortion of the machining optical path.

* * * * *